US012531019B2

(12) United States Patent
Cao et al.

(10) Patent No.: US 12,531,019 B2
(45) Date of Patent: Jan. 20, 2026

(54) DISPLAY SUBSTRATE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Dan Cao, Beijing (CN); Wenhui Gao, Beijing (CN); Miao Wang, Beijing (CN); Cong Liu, Beijing (CN); Binyan Wang, Beijing (CN); Jingwen Zhang, Beijing (CN); Yonglin Guo, Beijing (CN); Gukhwan Song, Beijing (CN); Zhen Liu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/696,852

(22) PCT Filed: May 30, 2023

(86) PCT No.: PCT/CN2023/097166
§ 371 (c)(1),
(2) Date: Mar. 28, 2024

(87) PCT Pub. No.: WO2024/243810
PCT Pub. Date: Dec. 5, 2024

(65) Prior Publication Data
US 2025/0022415 A1 Jan. 16, 2025

(51) Int. Cl.
*G09G 3/3225* (2016.01)

(52) U.S. Cl.
CPC ... *G09G 3/3225* (2013.01); *G09G 2300/0426* (2013.01); *G09G 2320/0247* (2013.01)

(58) Field of Classification Search
CPC .................. G09G 3/3233; G09G 3/32; G09G 2300/0857; G09G 2300/0842
See application file for complete search history.

(56) References Cited

U.S. PATENT DOCUMENTS 11,875,752 B2 * 1/2024 Yang .................... G09G 3/3275
12,150,353 B2 * 11/2024 Han .................... H10K 59/131
(Continued)

*Primary Examiner* — Van N Chow
(74) *Attorney, Agent, or Firm* — MUNCY, GEISSLER, OLDS & LOWE, P.C.

(57) ABSTRACT

A display substrate and a display device. The display substrate includes a base substrate and a plurality of sub-pixels arranged on the base substrate. A plurality of sub-pixel driving circuitries in the plurality of sub-pixels is arranged in columns, the columns of sub-pixel driving circuitries are divided into a plurality of column units, and each column unit includes at least two adjacent columns of sub-pixel driving circuitries. The display substrate further includes a first initialization signal transmission layer including a first initialization bus and a plurality of first initialization branches. The first initialization branch includes a first branch body member and a plurality of first branch extending members. The first branch body member is coupled to the sub-pixel driving circuitries in a corresponding column unit through the plurality of first branch extending members.

18 Claims, 34 Drawing Sheets

(56) References Cited

U.S. PATENT DOCUMENTS

| | | | | |
|---|---|---|---|---|
| 2021/0335989 A1* | 10/2021 | Diao | .................... | H10K 59/131 |
| 2021/0359075 A1* | 11/2021 | Liu | ...................... | H10K 50/813 |
| 2023/0165076 A1* | 5/2023 | Han | ..................... | G09G 3/3233<br>257/72 |

* cited by examiner

DISPLAY SUBSTRATE AND DISPLAY DEVICE

CROSS-REFERENCE TO RELATED APPLICATIONS

This application is the U.S. national phase of PCT Application No. PCT/CN2023/097166 filed on May 30, 2023, which is incorporated herein by reference in its entirety.

TECHNICAL FIELD

The present disclosure relates to the field of display technology, in particular to a display substrate and a display device.

BACKGROUND

With the development of the display technology, organic light-emitting diode display products are widely used in various fields due to such advantages as low power consumption, rapid response, a wide viewing angle, high resolution and being flexible. Usually, the resolution of the display product is between 400 ppi to 500 ppi, so an individual sub-pixel in the display product has a very small size, about 50 microns. In order to make a compromise between high frequency and low frequency, and improve the hysteresis and flickering, the design of the sub-pixel becomes more and more complex.

SUMMARY

An object of the present disclosure is to provide a display substrate and a display device, so as to solve the problem in the related art.

In order to achieve the above-mentioned object, the present disclosure provides the following technical solutions.

In one aspect, the present disclosure provides in some embodiments a display substrate, including a base substrate and a plurality of sub-pixels arranged on the base substrate. The sub-pixel includes a sub-pixel driving circuitry, the plurality of sub-pixel driving circuitries of the plurality of sub-pixels is arranged in columns along a first direction, the sub-pixel driving circuitries in each column include a plurality of sub-pixel driving circuitries arranged along a second direction, the first direction intersects with the second direction, the plurality of columns of sub-pixel driving circuitries is divided into a plurality of column units, and the column unit includes at least two adjacent columns of sub-pixel driving circuitries. The display substrate further includes a first initialization signal transmission layer including a first initialization bus and a plurality of first initialization branches coupled to the first initialization bus, the first initialization branch includes a first branch body member and a plurality of first branch extending members, the first branch body member includes at least a portion extending along the second direction, the first branch extending member includes at least a portion extending along the first direction, and the first branch body member is coupled to the sub-pixel driving circuitries in a corresponding column unit through the plurality of first branch extending members respectively.

In a possible embodiment of the present disclosure, the sub-pixel driving circuitries in the column unit are divided into a plurality of row units arranged along the second direction, the row unit includes at least two sub-pixel driving circuitries arranged along the first direction, and the first branch extending member is coupled to the sub-pixel driving circuitries in a corresponding row unit.

In a possible embodiment of the present disclosure, the first branch extending member includes a first extending sub-member and a second extending sub-member, the first extending sub-member is located at a first side of the first branch body member and coupled to the sub-pixel driving circuitries located at the first side of the first branch body member in the corresponding row unit, the second extending sub-member is located at a second side of the first branch body member and coupled to the sub-pixel driving circuitries located at the second side of the first branch body member in the corresponding row unit, and the first side is opposite to the second side along the first direction.

In a possible embodiment of the present disclosure, the column unit includes two adjacent columns of sub-pixel driving circuitries, the row unit includes two sub-pixel driving circuitries, the first extending sub-member is coupled to one of the two sub-pixel driving circuitries, and the second extending sub-member is coupled to the other of the two sub-pixel driving circuitries.

In a possible embodiment of the present disclosure, the first branch extending members are located at a same side of the first branch body member along the first direction, and the first branch extending member is coupled to the sub-pixel driving circuitries located at the same side in the corresponding row unit.

In a possible embodiment of the present disclosure, the display substrate further includes a second scanning line, the sub-pixel driving circuitry includes a driving transistor and a third resetting transistor, a gate electrode of the third resetting transistor is coupled to the corresponding second scanning line, a second electrode of the third resetting transistor is coupled to a first electrode of the driving transistor, the first extending sub-member is coupled to a first electrode of the third resetting transistor in a corresponding sub-pixel driving circuitry, and the second extending sub-member is coupled to a first electrode of the third resetting transistor in a corresponding sub-pixel driving circuitry.

In a possible embodiment of the present disclosure, the third resetting transistor includes a third resetting active layer, an orthogonal projection of a first end of the first extending sub-member onto the base substrate is spaced apart from an orthogonal projection of the third resetting active layer coupled to the first extending sub-member and arranged closest to the first branch body member onto the base substrate by a first distance along the first direction, and the first end is an end of the first extending sub-member close to the first branch body member coupled to the first extending sub-member. An orthogonal projection of a first end of the second extending sub-member onto the base substrate is spaced apart from an orthogonal projection of the third resetting active layer coupled to the second extending sub-member and arranged closest to the first branch body member onto the base substrate by a second distance along the first direction, the first end is an end of the second extending sub-member close to the first branch body member coupled to the second extending sub-member, and the first distance is less than the second distance.

In a possible embodiment of the present disclosure, an orthogonal projection of the first extending sub-member onto the base substrate does not overlap with an orthogonal projection of the second scanning line onto the base substrate; and/or an orthogonal projection of the second extending sub-member onto the base substrate partially overlaps with the orthogonal projection of the second scanning line onto the base substrate.

In a possible embodiment of the present disclosure, the display substrate further includes a second initialization signal line, the sub-pixel includes a light-emitting element, the sub-pixel driving circuitry includes a second resetting transistor, a gate electrode of the second resetting transistor is coupled to a corresponding second scanning line, a first electrode of the second resetting transistor is coupled to the second initialization signal line, and a second electrode of the second resetting transistor is coupled to the light-emitting element. The orthogonal projection of the first extending sub-member onto the base substrate at least partially overlaps with an orthogonal projection of the second initialization signal line onto the base substrate; and/or the orthogonal projection of the second extending sub-member onto the base substrate at least partially overlaps with the orthogonal projection of the second initialization signal line onto the base substrate.

In a possible embodiment of the present disclosure, the display substrate further includes a second scanning line, the sub-pixel includes a light-emitting element, the sub-pixel driving circuitry includes a second resetting transistor, a gate electrode of the second resetting transistor is coupled to a corresponding second scanning line, and a second electrode of the second resetting transistor is coupled to the light-emitting element. The first extending sub-member is coupled to a first electrode of the second resetting transistor in a corresponding sub-pixel driving circuitry, and the second extending sub-member is coupled to a first electrode of the second resetting transistor in a corresponding sub-pixel driving circuitry.

In a possible embodiment of the present disclosure, the second resetting transistor includes a second resetting active layer, an orthogonal projection of a first end of the first extending sub-member onto the base substrate is spaced apart from an orthogonal projection of the second resetting active layer coupled to the first extending sub-member and arranged closest to the first branch body member onto the base substrate by a third distance along the first direction, and the first end is an end of the first extending sub-member close to the first branch body member coupled to the first extending sub-member. An orthogonal projection of a first end of the second extending sub-member onto the base substrate is spaced apart from an orthogonal projection of the second resetting active layer coupled to the second extending sub-member and arranged closest to the first branch body member onto the base substrate by a fourth distance along the first direction, the first end is an end of the second extending sub-member close to the first branch body member coupled to the second extending sub-member, and the third distance is greater than the fourth distance.

In a possible embodiment of the present disclosure, an orthogonal projection of the first extending sub-member onto the base substrate partially overlaps with an orthogonal projection of the second scanning line onto the base substrate; and/or an orthogonal projection of the second extending sub-member onto the base substrate does not overlap with the orthogonal projection of the second scanning line onto the base substrate.

In a possible embodiment of the present disclosure, the display substrate further includes a third initialization signal line, the sub-pixel driving circuitry includes a driving transistor and a third resetting transistor, a gate electrode of the third resetting transistor is coupled to a corresponding second scanning line, a first electrode of the third resetting transistor is coupled to the third initialization signal line, and a second electrode of the third resetting transistor is coupled to the first electrode of the driving transistor. An orthogonal projection of the first extending sub-member onto the base substrate at least partially overlaps with an orthogonal projection of the third initialization signal line onto the base substrate; and/or an orthogonal projection of the second extending sub-member onto the base substrate does not overlap with the orthogonal projection of the second initialization signal line onto the base substrate.

In a possible embodiment of the present disclosure, the first branch body member and the first branch extending members form a one-piece structure.

In a possible embodiment of the present disclosure, the display substrate includes a first source/drain metal layer, and the first branch body member and the first branch extending members are arranged at a same layer and made of a same material as the first source/drain metal layer.

In a possible embodiment of the present disclosure, the display substrate further includes a second initialization signal transmission layer, and the second initialization signal transmission layer includes two second initialization buses arranged opposite to each other along the second direction, and a grid-like branch located between the two second initialization buses, and coupled to the two second initialization buses.

In a possible embodiment of the present disclosure, the grid-like branch includes a plurality of second initialization branches arranged along the first direction and a plurality of third initialization branches arranged along the second direction, and the plurality of third initialization branches is coupled to the plurality of second initialization branches respectively. The plurality of sub-pixel driving circuitries of the plurality of sub-pixels is arranged in rows along the second direction, and the sub-pixel driving circuitries in each row include a plurality of sub-pixel driving circuitries arranged along the first direction. The third initialization branches are coupled to the sub-pixel driving circuitries in a corresponding row respectively.

In a possible embodiment of the present disclosure, the display substrate further includes a second scanning line, the sub-pixel includes a light-emitting element, the sub-pixel driving circuitry includes a second resetting transistor, a gate electrode of the second resetting transistor is coupled to a corresponding second scanning line, and a second electrode of the second resetting transistor is coupled to the light-emitting element. The third initialization branch is coupled to a first electrode of the second resetting transistor in each sub-pixel driving circuitry in the corresponding row.

In a possible embodiment of the present disclosure, the display substrate further includes a second scanning line, the sub-pixel driving circuitry includes a driving transistor and a third resetting transistor, a gate electrode of the third resetting transistor is coupled to a corresponding second scanning line, and a second electrode of the third resetting transistor is coupled to the first electrode of the driving transistor. The third initialization branch is coupled to a first electrode of the third resetting transistor in each sub-pixel driving circuitry in the corresponding row.

In a possible embodiment of the present disclosure, the display substrate further includes a second gate metal layer and a first source/drain metal layer, the second initialization branch is arranged at a same layer and made of a same material as the first source/drain metal layer, and the third initialization branch is arranged at a same layer and made of a same material as the second gate metal layer.

In a possible embodiment of the present disclosure, orthogonal projections of a first branch body members onto the base substrate and orthogonal projections of b second initialization branches onto the base substrate are arranged alternately along the first direction, where a is an integer greater than or equal to 1, and b is an integer greater than or equal to 1.

In a possible embodiment of the present disclosure, the quantity of second initialization branches is less than the quantity of columns of the sub-pixel driving circuitries.

In a possible embodiment of the present disclosure, the display substrate further includes a third initialization signal transmission layer including a third initialization bus and a plurality of fourth initialization branches coupled to the third initialization bus. The sub-pixel driving circuitry includes a driving transistor and a first resetting transistor, a first electrode of the first resetting transistor is coupled to a corresponding fourth initialization branch, and a second electrode of the first resetting transistor is coupled to the gate electrode of the driving transistor.

In a possible embodiment of the present disclosure, the third initialization signal transmission layer includes two third initialization buses arranged opposite to each other along the first direction, the plurality of fourth initialization branches is arranged along the second direction, the fourth initialization branches are coupled to the two third initialization buses respectively, and the fourth initialization branches are coupled to the sub-pixel driving circuitries in a corresponding row respectively.

In a possible embodiment of the present disclosure, the fourth initialization branch includes a fourth branch body member and a fourth branch protruding member, the fourth branch body member extends along the first direction, and the fourth branch protruding member protrudes from the fourth branch body member along the second direction. The sub-pixel driving circuitry includes a driving transistor and a compensation transistor, a first electrode of the compensation transistor is coupled to a second electrode of the driving transistor, a second electrode of the compensation transistor is coupled to a gate electrode of the driving transistor, the compensation transistor includes a compensation active layer, the compensation active layer includes two channel portions and a conductor portion coupled to the two channel portions, and an orthogonal projection of the conductor portion onto the base substrate at least partially overlaps with an orthogonal projection of the fourth branch protruding member onto the base substrate.

In a possible embodiment of the present disclosure, the third initialization signal transmission layer includes two third initialization buses arranged opposite to each other along the second direction, and the plurality of fourth initialization branches is arranged along the first direction and coupled to the two third initialization buses respectively. The fourth initialization branches are coupled to the sub-pixel driving circuitries in a corresponding column respectively.

In a possible embodiment of the present disclosure, orthogonal projections of a first branch body members onto the base substrate, orthogonal projections of b second initialization branches onto the base substrate, and orthogonal projections of c fourth initialization branches onto the base substrate are arranged alternately along the first direction, where a is an integer greater than or equal to 1, b is an integer greater than or equal to 1, and c is an integer greater than or equal to 1.

In another aspect, the present disclosure provides in some embodiments a display device including the above-mentioned display substrate.

In yet another aspect, the present disclosure provides in some embodiments a display substrate, including a base substrate and a plurality of sub-pixels arranged on the base substrate. The sub-pixel includes a sub-pixel driving circuitry, the plurality of sub-pixel driving circuitries of the plurality of sub-pixels are arranged in columns along a first direction, the sub-pixel driving circuitries in each column include a plurality of sub-pixel driving circuitries arranged along a second direction, the first direction intersects with the second direction, the plurality of columns of sub-pixel driving circuitries is divided into a plurality of column units, and the column unit includes at least two adjacent columns of sub-pixel driving circuitries. The display substrate further includes: a plurality of first initialization branches, an orthogonal projection of at least a part of the first initialization branch onto the base substrate being located between orthogonal projections of the sub-pixel driving circuitries in adjacent columns onto the base substrate, the first initialization branch including a first branch body member and a plurality of first branch extending members, the first branch body member including at least a portion extending along the second direction, the first branch extending member including at least a portion extending along the first direction, and the first branch body member being coupled to the sub-pixel driving circuitries in a corresponding column unit through the plurality of first branch extending members; and a plurality of second initialization branches and a plurality of third initialization branches, the plurality of second initialization branches being coupled to the plurality of third initialization branches to form a grid-like branch, the plurality of sub-pixel driving circuitries in the plurality of sub-pixels being arranged in rows along the second direction, the sub-pixel driving circuitries in each row including a plurality of sub-pixel driving circuitries arranged along the first direction, the third initialization branch being coupled to the sub-pixel driving circuitries in a corresponding row. Orthogonal projections of the first branch body members onto the base substrate and orthogonal projections of the second initialization branches onto the base substrate are arranged alternately.

In a possible embodiment of the present disclosure, the display substrate further includes a second scanning line, the sub-pixel driving circuitry includes a driving transistor and a third resetting transistor, a gate electrode of the third resetting transistor is coupled to a corresponding second scanning line, and a second electrode of the third resetting transistor is coupled to a first electrode of the driving transistor. The sub-pixel includes a light-emitting element, the sub-pixel driving circuitry further includes a second resetting transistor, a gate electrode of the second resetting transistor is coupled to a corresponding second scanning line, and a second electrode of the second resetting transistor is coupled to the light-emitting element. The first branch extending member is coupled to a first electrode of the third resetting transistor in a corresponding sub-pixel driving circuitry, and the third initialization branch is coupled to a first electrode of the second resetting transistor in each sub-pixel driving circuitry in a corresponding row; or the first branch extending member is coupled to a first electrode of the second resetting transistor in a corresponding sub-pixel driving circuitry, and the third initialization branch is coupled to a first electrode of the third resetting transistor in each sub-pixel driving circuitry in a corresponding row.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

The present disclosure will be described hereinafter in conjunction with the drawings and embodiments.

Display products become more and more complex, so the layout of signal lines in the display product is particularly important. In the layout of signal lines, there is an urgent need to reduce the loading of the signal line, reduce the layout difficulty and ensure the signal transmission stability.

Figure 5:
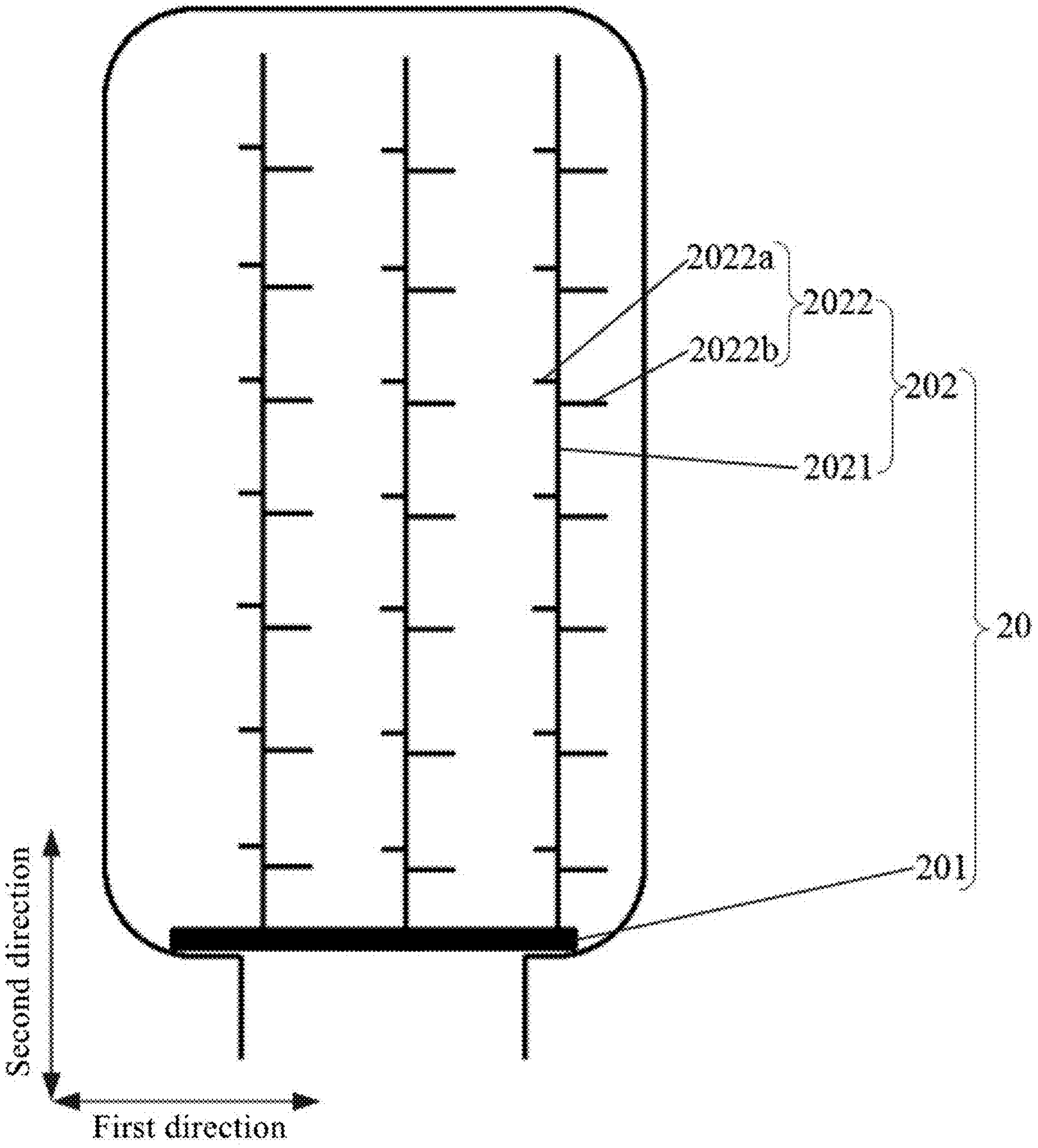
FIG. 5 is a schematic view showing a first initialization signal transmission layer according to one embodiment of the present disclosure.
Figure 6:
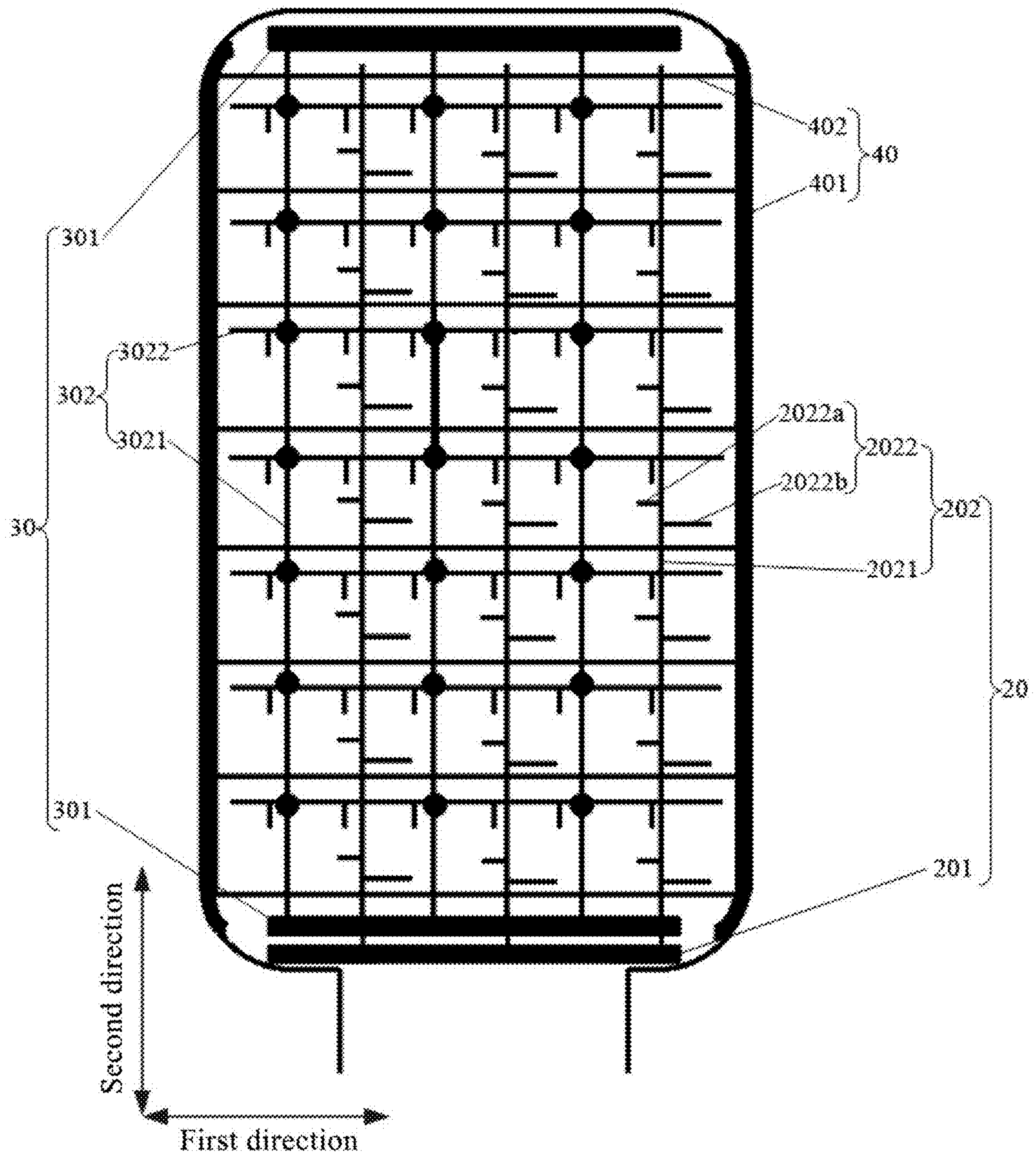
FIG. 6 is a schematic view showing three initialization signal transmission layers according to one embodiment of the present disclosure.
Figure 7:
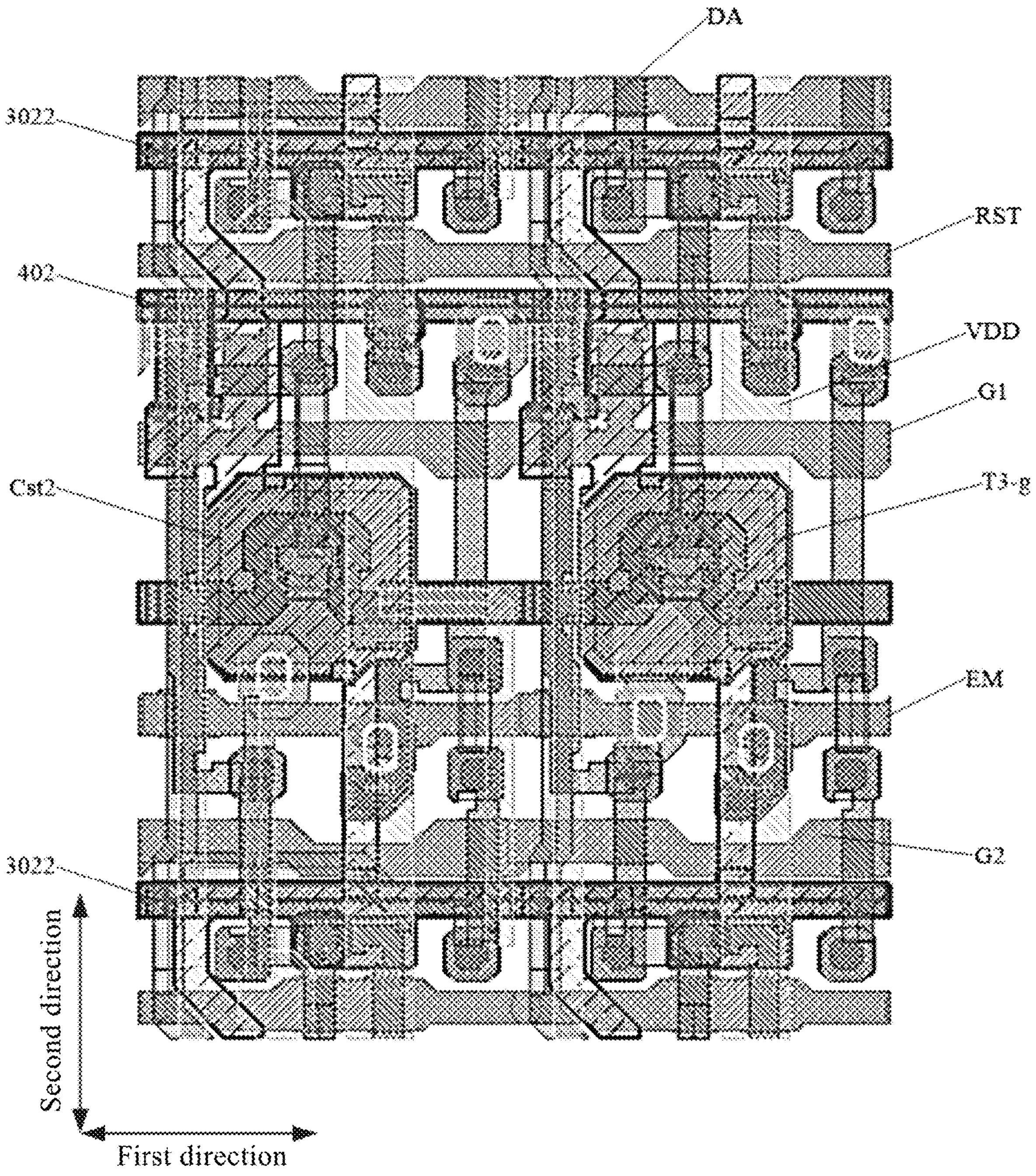
FIG. 7 is a schematic view showing the layout of two sub-pixel driving circuitries according to one embodiment of the present disclosure.
Figure 8:
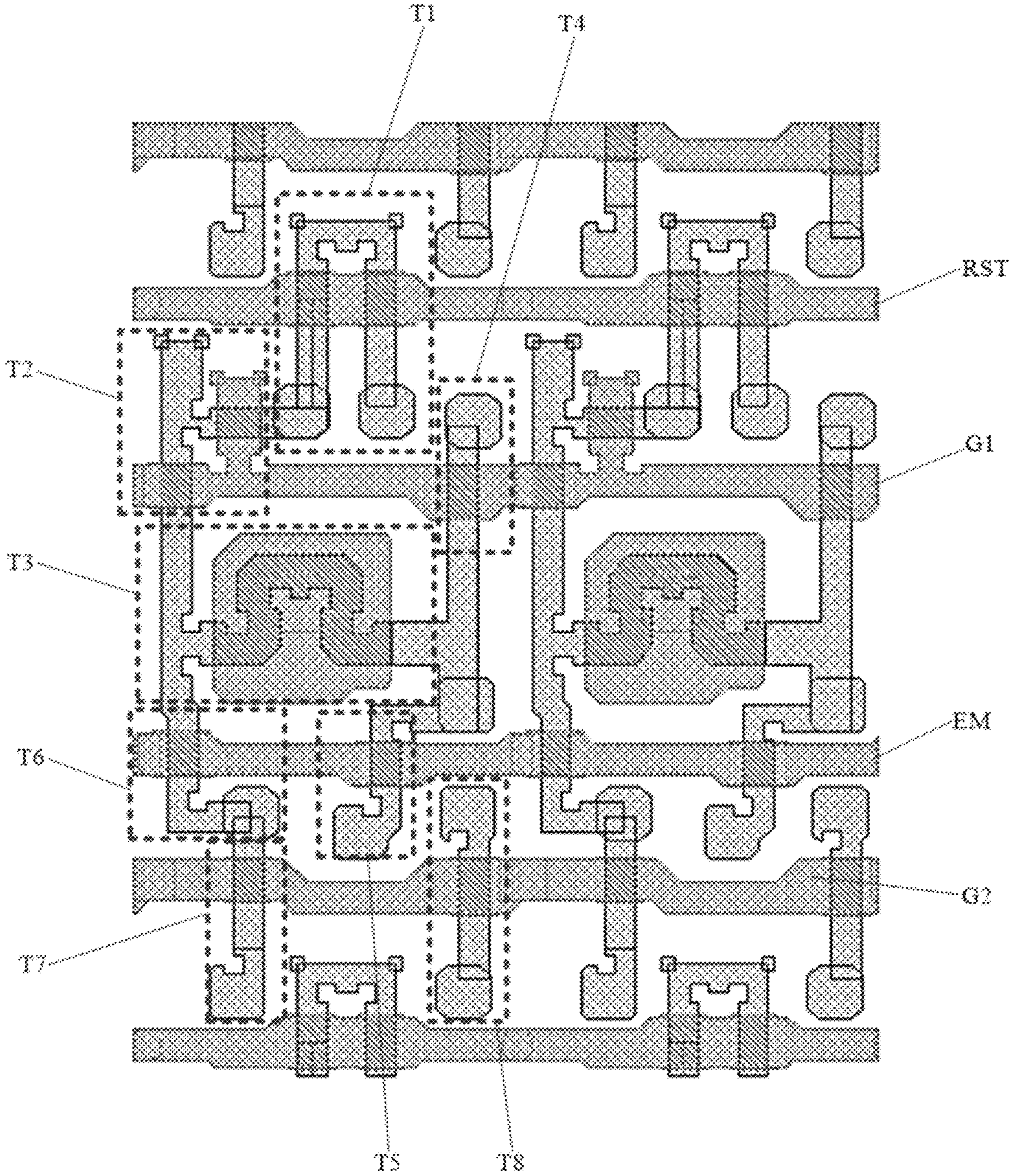
FIG. 8 is a schematic view showing the layout of an active layer and a first gate metal layer in FIG. 7.
Figure 9:
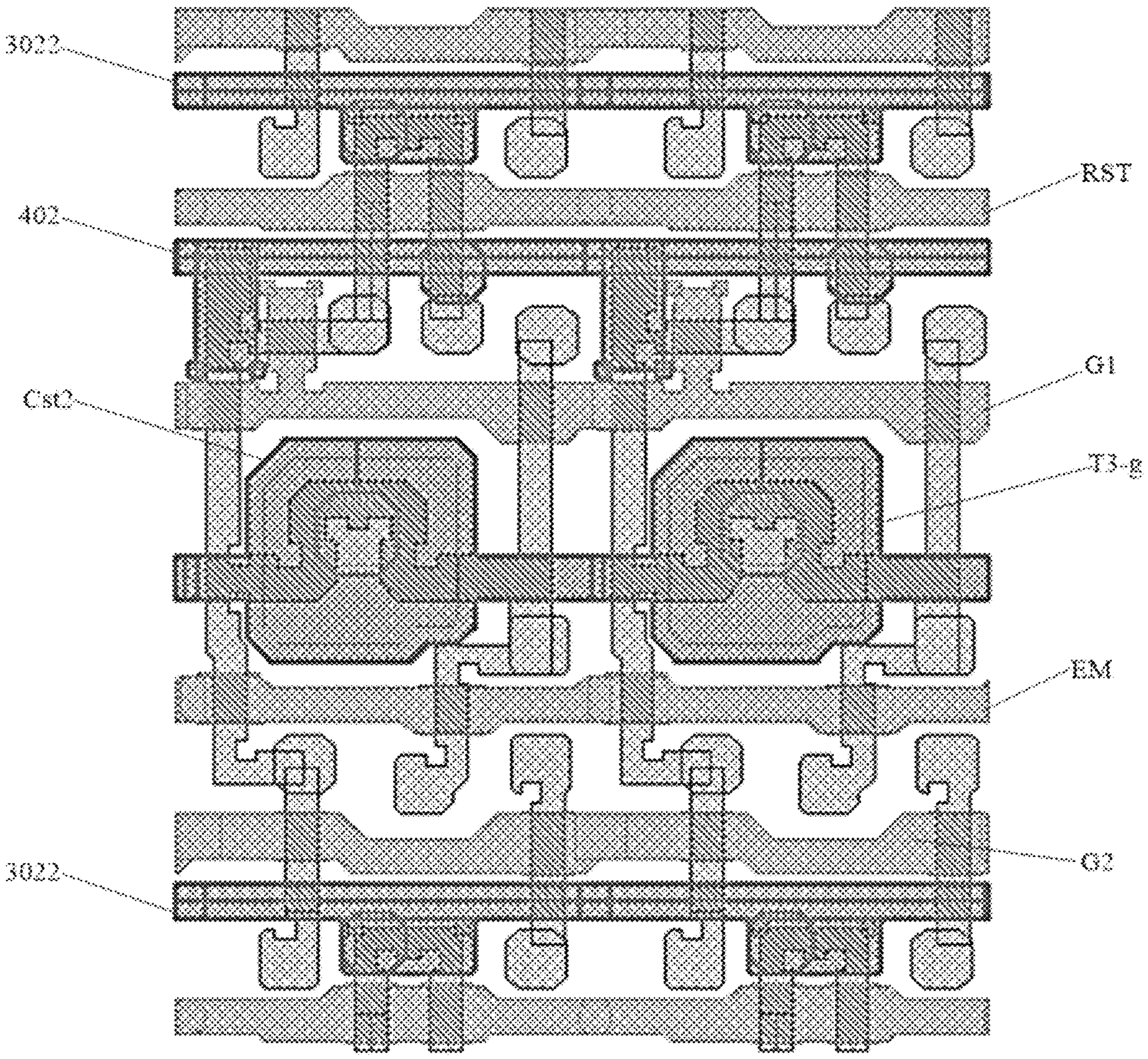
FIG. 9 is a schematic view showing the layout of the active layer, the first gate metal layer and a second gate metal layer in FIG. 7.
Figure 10:
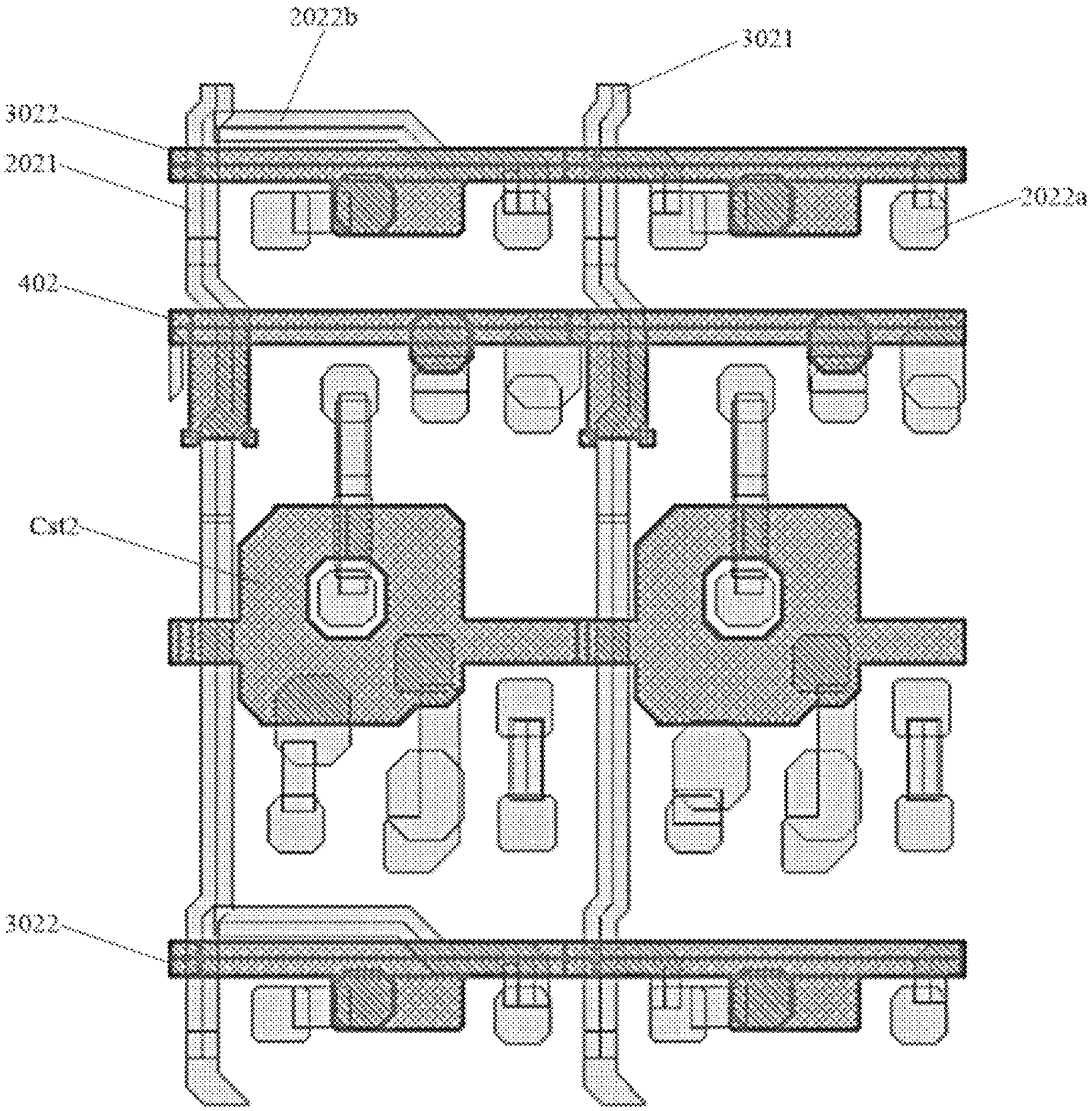
FIG. 10 is a schematic view showing the layout of the second gate metal layer and a first source/drain metal layer in FIG. 7.
Figure 11:
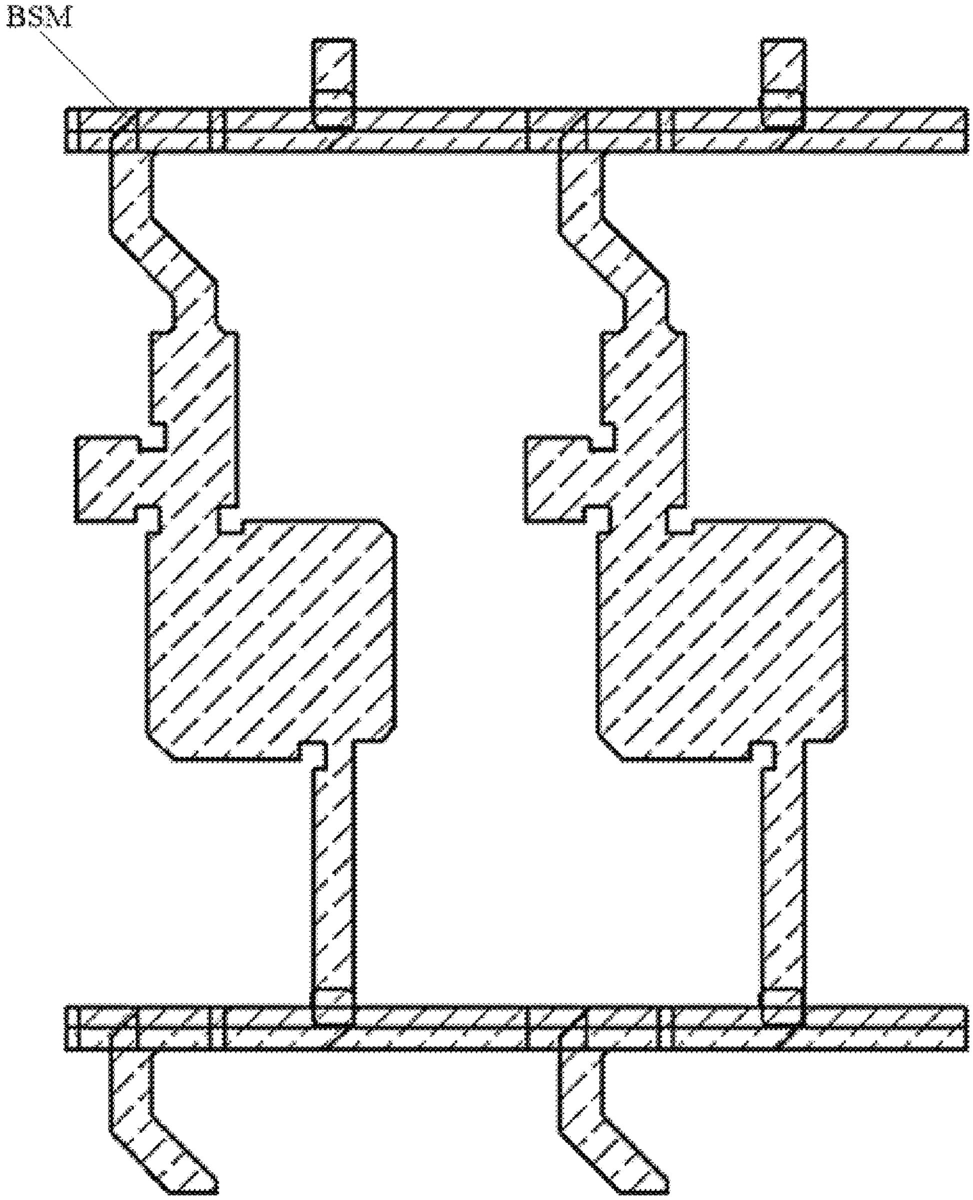
FIG. 11 is a schematic view showing the layout of a light-shielding layer in FIG. 7.

Referring to FIG. 5 and FIG. 6, the present disclosure provides in some embodiments a display substrate, which includes a base substrate and a plurality of sub-pixels arranged on the base substrate. The sub-pixel includes a sub-pixel driving circuitry, the plurality of sub-pixel driving circuitries of the plurality of sub-pixels is arranged in columns along a first direction, the sub-pixel driving circuitries in each column include a plurality of sub-pixel driving circuitries arranged along a second direction, the first direction intersects with the second direction, the plurality of columns of sub-pixel driving circuitries is divided into a plurality of column units, and the column unit includes at least two adjacent columns of sub-pixel driving circuitries. The display substrate further includes a first initialization signal transmission layer 20, the first initialization signal transmission layer 20 includes a first initialization bus 201 and a plurality of first initialization branches 202 coupled to the first initialization bus 201, the first initialization branch 202 includes a first branch body member 2021 and a plurality of first branch extending members 2022, the first branch body member 2021 includes at least a portion extending along the second direction, the first branch extending member 2022 includes at least a portion extending along the first direction, and the first branch body member 2021 is coupled to the sub-pixel driving circuitries in a corresponding column unit through the plurality of first branch extending members 2022.

Illustratively, the display substrate includes a plurality of sub-pixels, and a plurality of sub-pixel driving circuitries in the sub-pixels is distributed in an array form. The plurality of sub-pixel driving circuitries is arranged in columns and rows. The rows of the sub-pixel driving circuitries are arranged in the second direction, and each row includes a plurality of sub-pixel driving circuitries arranged in the first direction. The columns of the sub-pixel driving circuitries are arranged in the first direction, and each column includes a plurality of sub-pixel driving circuitries arranged in the second direction. Illustratively, the first direction intersects the second direction. For example, the first direction includes a transverse direction and the second direction includes a longitudinal direction.

Illustratively, the sub-pixel includes a sub-pixel driving circuitry and a light-emitting element. The sub-pixel driving circuitry is coupled to an anode of the light-emitting element, and configured to provide a driving signal to the light-emitting element, so as to drive the light-emitting element to emit light.

Illustratively, the plurality of columns of sub-pixel driving circuitries is divided into a plurality of column units arranged along the first direction, and each column unit includes sub-pixel driving circuitries arranged in two adjacent columns.

Illustratively, the first initialization signal transmission layer 20 is configured to transmit an initialization signal.

Illustratively, the display substrate includes a display region and a peripheral region surrounding the display region. The first initialization bus 201 is located in the peripheral region.

Illustratively, the first initialization signal transmission layer 20 includes one first initialization bus 201 located, but not limited to, in a lower bezel region of the peripheral region.

Illustratively, the first initialization signal transmission layer 20 includes two first initialization buses 201 arranged opposite to each other in the second direction. One first initialization bus 201 is located in an upper bezel region of the peripheral region, and the other first initialization bus 201 is located in a lower bezel region of the peripheral region.

Illustratively, the first branch body member 2021 of the first initialization branch 202 extends from the display region to the peripheral region, so as to be electrically coupled to the first initialization bus 201.

Illustratively, the quantity of the first branch body members 2021 is less than the quantity of the columns of the sub-pixel driving circuitries.

Illustratively, the plurality of first initialization branches 202 corresponds to the plurality of column units respectively. The first initialization branch 202 is located in a region where the corresponding column unit is located. It should be appreciated that, the region where the column unit is located is a region where all the sub-pixel driving circuitries in the column unit are located, and a region where each sub-pixel driving circuitry is located is a region for accommodating the sub-pixel driving circuitry. Illustratively, the region is, but not limited to, a rectangular region.

Illustratively, the first branch extending member 2022 is coupled to a corresponding sub-pixel driving circuitry and the first branch body member 2021. An initialization signal is transmitted from the first initialization bus 201 to each sub-pixel driving circuitry in a corresponding column unit through the first branch body member 2021 and the first branch extending member 2022.

According to the structure of the display substrate in the embodiments of the present disclosure, the plurality of columns of sub-pixel driving circuitries is divided into the plurality of column units, and the sub-pixel driving circuitries in each column unit are coupled to the first initialization bus 201 through a corresponding first initialization branch 202. In this way, it is able to not only ensure that each sub-pixel driving circuitry in the display substrate receives the initialization signal, but also reduce the quantity of first initialization branches 202, thereby to reduce the layout difficulty of the first initialization signal transmission layer 20 in a limited layout space.

Furthermore, the first initialization branch 202 includes the first branch body member 2021 and the plurality of first branch extending members 2022, and the first branch body member 2021 is coupled to the first initialization bus 201, and coupled to each sub-pixel driving circuitry in a corresponding column unit through the first branch extending member 2022. As a result, it is able to shorten the first initialization branch 202, reduce the loading of the first initialization branch 202, and ensure a uniform voltage of the initialization signal received by the sub-pixel driving circuitries at different positions, thereby to ensure the stability of the initialization signal and prevent the occurrence of mura.

In some embodiments of the present disclosure, all the sub-pixel driving circuitries in the column unit are divided into a plurality of row units arranged along the second direction, the row unit includes at least two sub-pixel driving circuitries arranged along the first direction, and the first branch extending member 2022 is coupled to the sub-pixel driving circuitries in a corresponding row unit.

Illustratively, the plurality of row units corresponds to the plurality of first branch extending members 2022 of the first initialization branch 202 respectively.

Based on the above, it is able to not only ensure that each sub-pixel driving circuitry in the display substrate receives the initialization signal, but also reduce the layout difficulty of the first initialization signal transmission layer 20 in a limited layout space.

As shown in FIGS. 5, 7, 8, 10, 12, 16-18, 19, 20, 22, 24, 28, 31, 32, and 33, in some embodiments of the present disclosure, the first branch extending member 2022 includes a first extending sub-member **2022*a* and a second extending sub-member 2022*b*. The first extending sub-member 2022*a* is located at a first side of the first branch body member 2021, and coupled to the sub-pixel driving circuitries located at the first side of the first branch body member 2021 in a corresponding row unit. The second extending sub-member 2022*b* is located at a second side of the first branch body member 2021, and coupled to the sub-pixel driving circuitries located at the second side of the first branch body member 2021** in a corresponding row unit. The first side is arranged opposite to the second side along the first direction.

Illustratively, at least a part of an orthogonal projection of the first branch body member 2021 onto the base substrate is arranged between an orthogonal projection of the first extending sub-member **2022*a* onto the base substrate and an orthogonal projection of the second extending sub-member 2022*b*** onto the base substrate.

Illustratively, the orthogonal projection of the first branch body member 2021 onto the base substrate is arranged between an orthogonal projection of the sub-pixel driving circuitry coupled to the first extending sub-member **2022*a* onto the base substrate and an orthogonal projection of the sub-pixel driving circuitry coupled to the second extending sub-member 2022*b*** onto the base substrate.

Illustratively, the orthogonal projection of the first branch body member 2021 onto the base substrate at least partially overlaps with orthogonal projections of the sub-pixel driving circuitries in one column in a corresponding column unit onto the base substrate.

Illustratively, a first end of the first extending sub-member 2022*a* is coupled to the first branch body member 2021, and a first end of the second extending sub-member 2022*b* is coupled to the first branch body member 2021. The first end of the first extending sub-member 2022*a* is offset from the first end of the second extending sub-member 2022*b* in the second direction.

Based on the above, the first branch extending member 2022 includes the first extending sub-member 2022*a* and the second extending sub-member 2022*b*, so each extending sub-member is shortened. As a result, it is able to ensure that each sub-pixel driving circuitry in the display substrate receives the initialization signal, reduce the layout difficulty of the first branch extending member 2022 in a limited layout space, and reduce the loading of each extending sub-member.

As shown in FIGS. 5, 7, 8, 10, 12, 16-18, 19, 20, 22, 24, 28, 31, 32 and 33, in some embodiments of the present disclosure, the column unit includes two adjacent columns of sub-pixel driving circuitries, the row unit includes two sub-pixel driving circuitries, the first extending sub-member 2022*a* is coupled to one of the two sub-pixel driving circuitries, and the second extending sub-member 2022*b* is coupled to the other of the two sub-pixel driving circuitries.

Based on the above, it is able to reduce the layout difficulty of the first initialization branch 202 in a limited layout space, and reduce the loading of the first initialization branch 202.

In some embodiments of the present disclosure, the first branch extending members 2022 are located on a same side of the first branch body member 2021 along the first direction, and each first branch extending member 2022 is coupled to the sub-pixel driving circuitries located on the same side in a corresponding row unit.

Illustratively, the orthogonal projections of the first branch body members 2021 onto the base substrate are arranged on a same side of an orthogonal projection of the corresponding column unit onto the base substrate.

Illustratively, the orthogonal projection of the first branch body member 2021 onto the base substrate at least partially overlaps with the orthogonal projections of the sub-pixel driving circuitries in one column in the corresponding column units onto the base substrate.

Based on the above, it is able to reduce the layout difficulty of the first initialization branch 202 in a limited layout space, and reduce the loading of the first initialization branch 202.

As shown in FIGS. 1, 5, 7, 8, 10, 12, and 16-18, in some embodiments of the present disclosure, the display substrate further includes a second scanning line G2. The sub-pixel driving circuitry includes a driving transistor (namely, a third transistor T3) and a third resetting transistor (namely, an eighth transistor T8), a gate electrode of the third resetting transistor is coupled to a corresponding second scanning line G2, and a second electrode of the third resetting transistor is coupled to a first electrode of the driving transistor. The first extending sub-member 2022*a* is coupled to a first electrode of the third resetting transistor in a corresponding sub-pixel driving circuitry, and the second extending sub-member 2022*b* is coupled to a first electrode of the third resetting transistor in a corresponding sub-pixel driving circuitry.

Illustratively, the display substrate further includes a plurality of second scanning lines G2, and each second scanning line G2 is coupled to the gate electrodes of the third resetting transistors in the sub-pixel driving circuitries in a corresponding row.

Illustratively, the first initialization signal transmission layer 20 is used to transmit a third initialization signal Vinit3, and the third resetting transistor resets the first electrode of the driving transistor using the third initialization signal Vinit3.

Based on the above, the first initialization signal transmission layer 20 is used to transmit the third initialization signal Vinit3, so as to reset the first electrode of the driving transistor.

Figure 1:
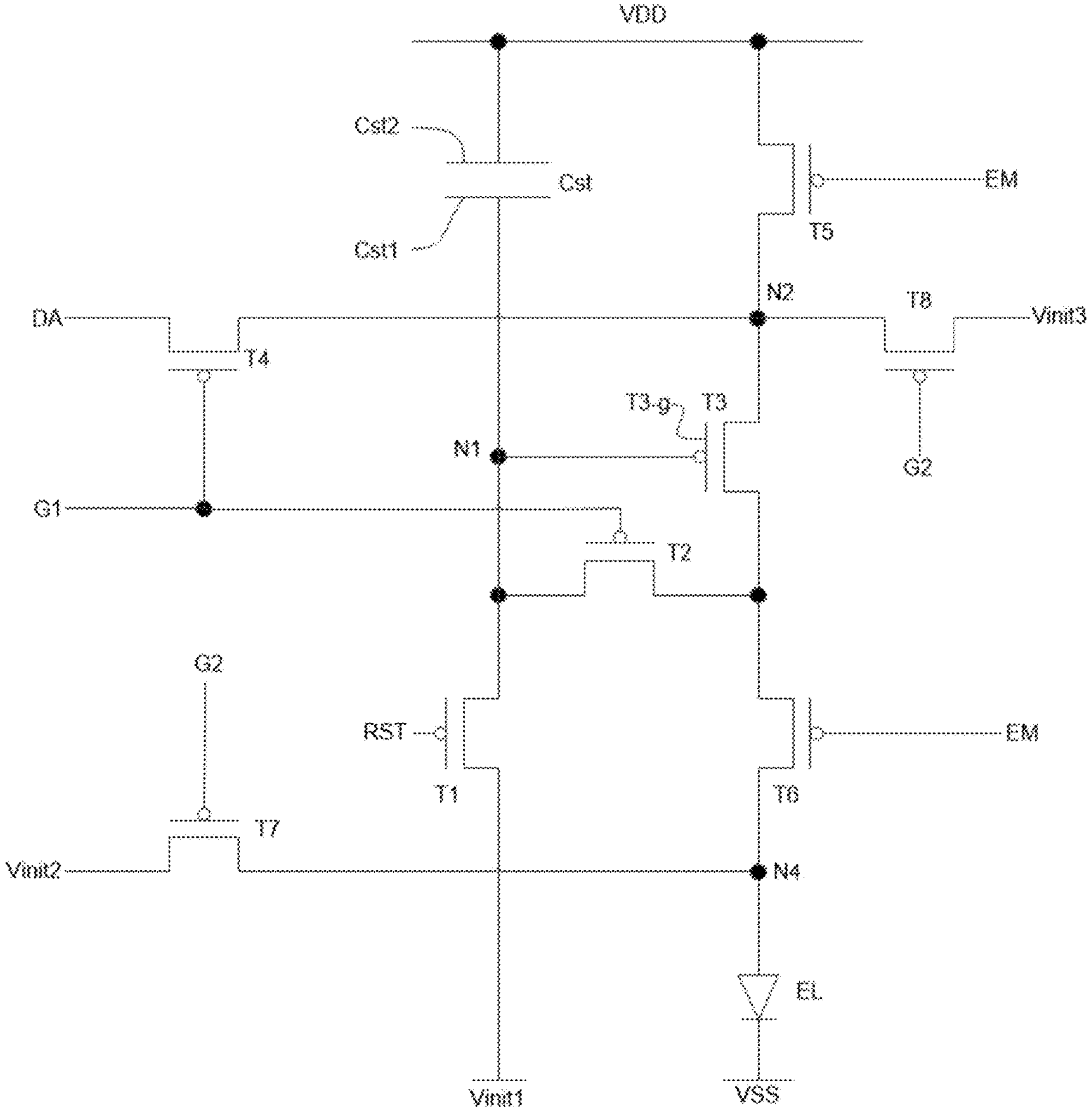
FIG. 1 is a circuit diagram of a sub-pixel driving circuitry according to one embodiment of the present disclosure.

As shown in FIG. 1, in some embodiments of the present disclosure, the sub-pixel driving circuitry has an 8T2C structure (i.e. 8 transistors and 2 capacitors), and the structure includes the third resetting transistor. The third resetting transistor is used to refresh a node N2 (namely, the first electrode of the driving transistor) through timing control, so as to make a compromise between high frequency and low frequency, and improve the hysteresis and flickering.

The first initialization signal transmission layer 20 is used to transmit the third initialization signal Vinit3, so as to reset the first electrode of the driving transistor. High and low voltages are written into the first electrode of the driving transistor alternately so as to improve the hysteresis of the driving transistor.

Based on the above-mentioned structure, it is able to provide low loading, transmit the third initialization signal Vinit3 through the first initialization signal transmission layer, and improve the uniformity of the third initialization signal Vinit3, thereby to ensure the display quality of the display product at a low gray level.

As shown in FIGS. 10, 12, 16 and 17, in some embodiments of the present disclosure, the third resetting transistor includes a third resetting active layer 58, and along the first direction, an orthogonal projection of a first end of the first extending sub-member 2022*a* onto the base substrate is spaced apart from an orthogonal projection of the third resetting active layer 58 coupled to the first extending sub-member 2022*a* and arranged closest to the first branch body member 2021 onto the base substrate by a first distance d1, and the first end is an end of the first extending sub-member 2022*a* close to the first branch body member 2021 coupled to the first extending sub-member 2022*a*. Along the first direction, an orthogonal projection of a first end of the second extending sub-member 2022*b* onto the base substrate is spaced apart from an orthogonal projection of the third resetting active layer 58 coupled to the second extending sub-member 2022*b* and arranged closest to the first branch body member 2021 onto the base substrate by a second distance d2. The first end is an end of the second extending sub-member 2022*b* close to the first branch body member 2021 coupled to the second extending sub-member 2022*b*. The first distance d1 is less than the second distance d2.

Illustratively, the third resetting active layer 58 includes at least a portion extending along the second direction, and the third resetting active layer 58 is configured to form the first electrode, the second electrode, and a channel portion 52*a* of the third resetting transistor.

Illustratively, the first distance is between 2.2 microns and 2.6 microns, with endpoints being inclusive. For example, the first distance is 2.4 microns. The second distance is between 21 microns and 23 microns, with endpoints being inclusive. For example, the second distance is 21.25 microns. Illustratively, the second distance is approximately 9 times the first distance.

Based on the above, the first branch body member 2021 is approximately located between two columns of sub-pixel driving circuitries. In this way, it is able to reduce a parasitic capacitance generated between the first branch body member 2021 and the other structures, thereby to reduce the loading of the first branch body member 2021.

As shown in FIGS. 7-18 and 34, in some embodiments of the present disclosure, the orthogonal projection of the first extending sub-member 2022*a* onto the base substrate does not overlap with an orthogonal projection of the second scanning line G2 onto the base substrate; and/or the orthogonal projection of the second extending sub-member 2022*b* onto the base substrate partially overlaps with the orthogonal projection of the second scanning line G2 onto the base substrate.

Based on the above, the first extending sub-member 2022*a* and the second extending sub-member 2022*b* are arranged away from the second scanning line G2 as possible in a limited layout space, so as to prevent any change in the initialization signal transmitted on the first extending sub-member 2022*a* and the second extending sub-member 2022*b* due to a signal jump on the second scanning line G2, thereby to ensure the uniformity of the initialization signal written into each sub-pixel driving circuitry.

Figure 16:
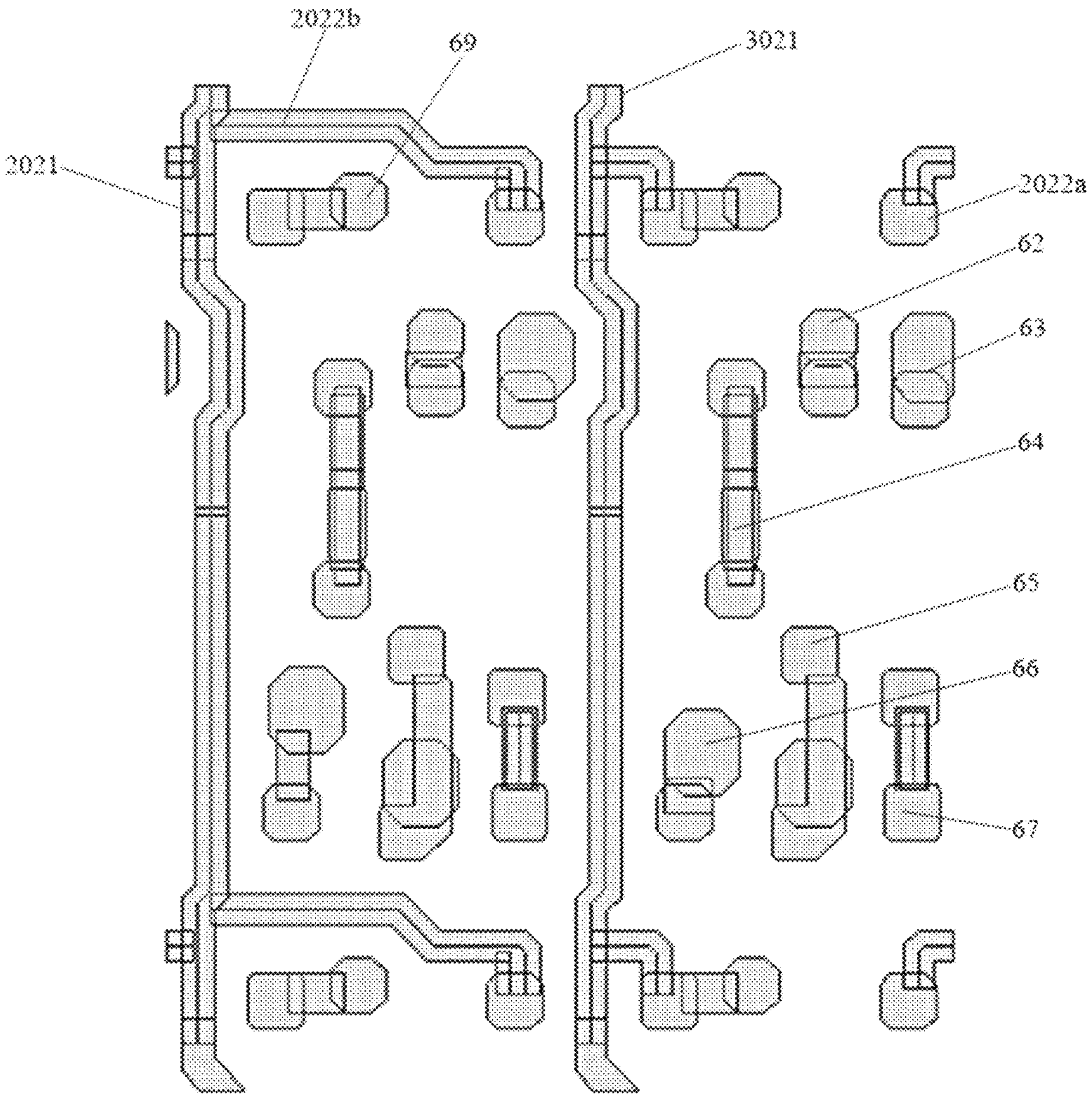
FIG. 16 is a schematic view showing the layout of the first source/drain metal layer in FIG. 7.
Figure 17:
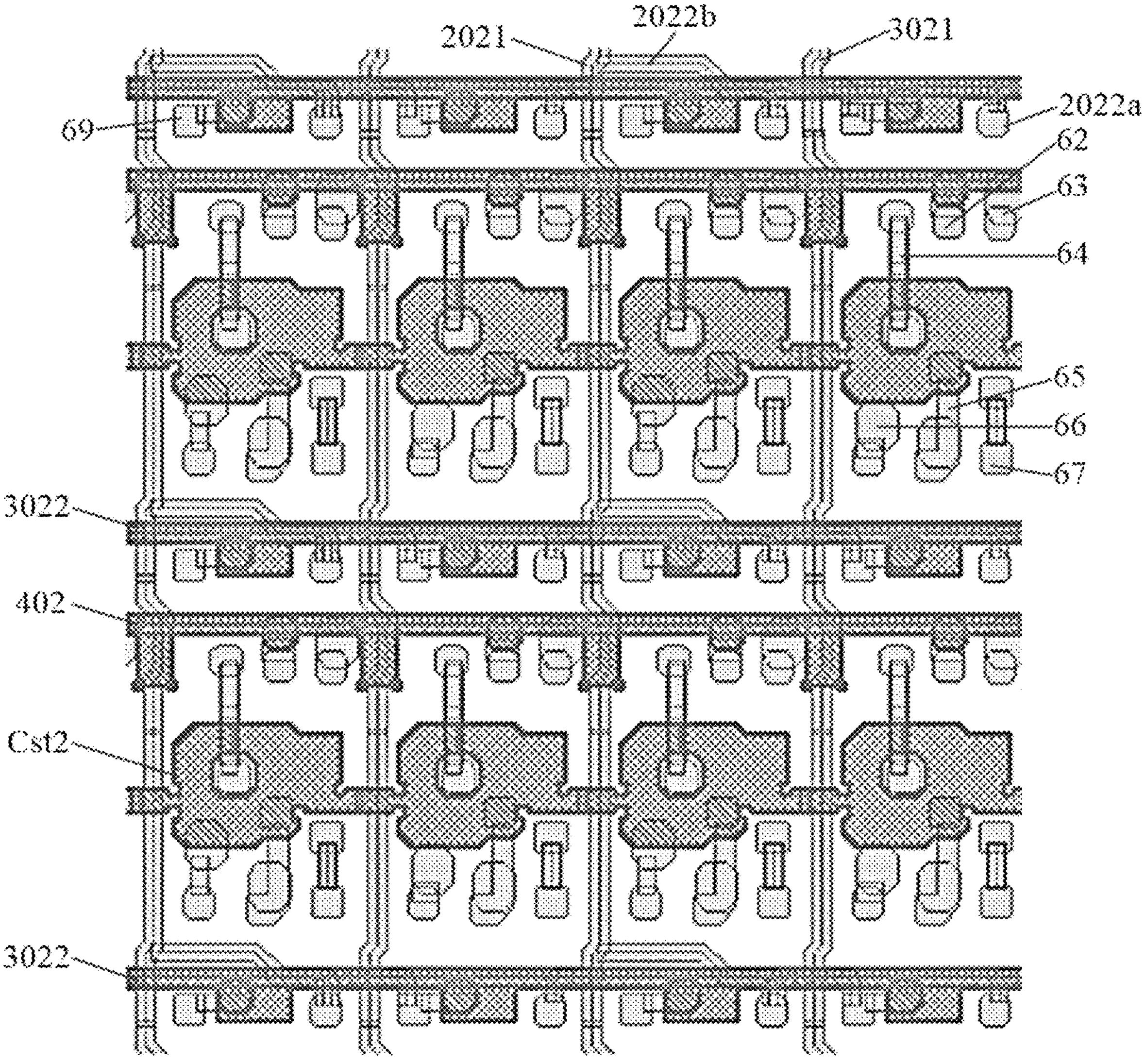
FIG. 17 is a schematic view showing the layout of the second gate metal layer in a 2*4 matrix and the first source/drain metal layer according to one embodiment of the present disclosure.
Figure 18:
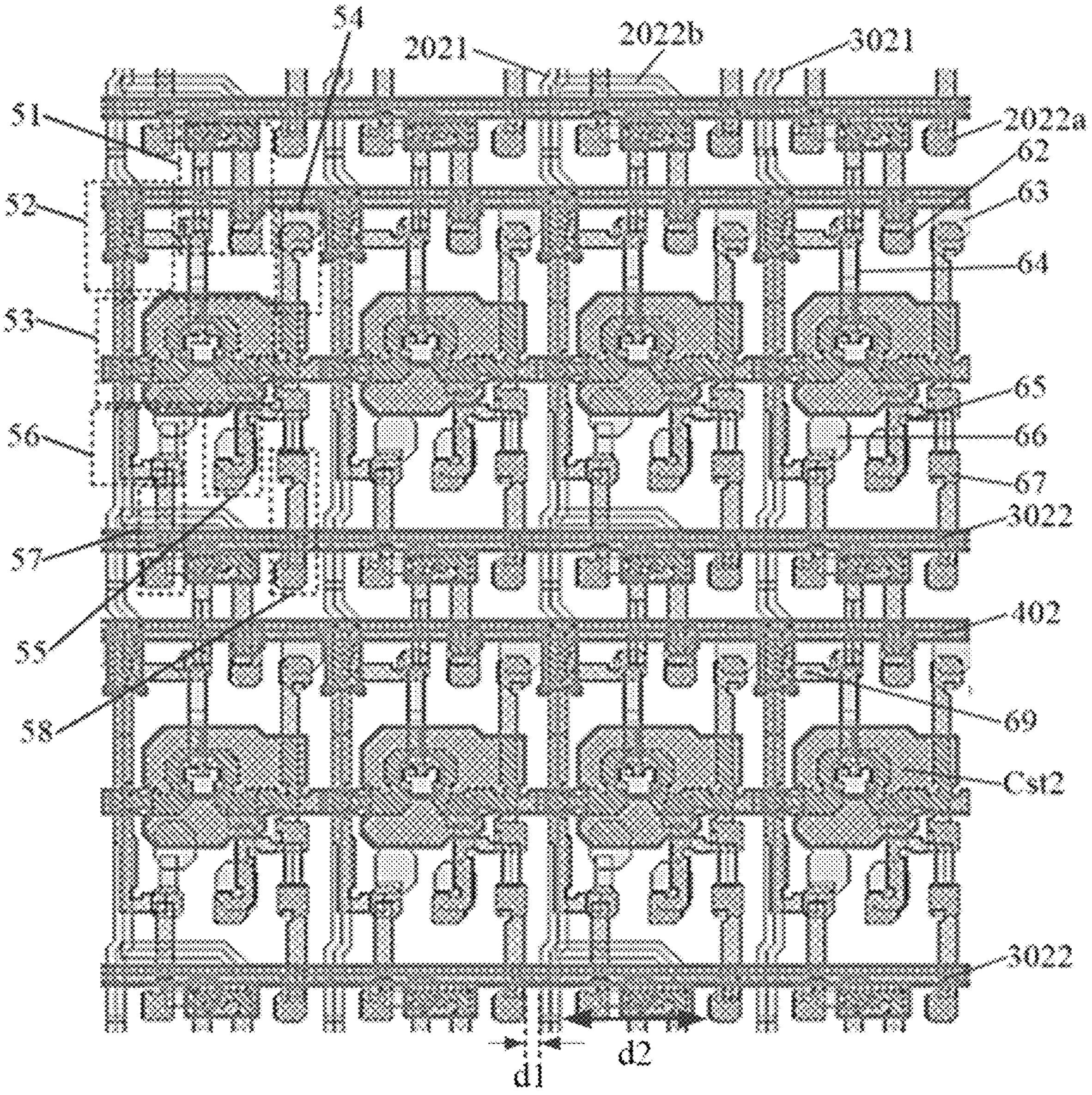
FIG. 18 is a schematic view showing the display substrate with the active layer on the basis of FIG. 17.

As shown in FIGS. 7 to 18, in some embodiments of the present disclosure, the display substrate further includes a second initialization signal line (3022 in FIG. 17). The sub-pixel includes a light-emitting element, the sub-pixel driving circuitry includes a second resetting transistor (namely, a seventh transistor T7), a gate electrode of the second resetting transistor is coupled to a corresponding second scanning line G2, a first electrode of the second resetting transistor is coupled to the second initialization signal line, and a second electrode of the second resetting transistor is coupled to the light-emitting element.

The orthogonal projection of the first extending sub-member 2022*a* onto the base substrate at least partially overlaps with an orthogonal projection of the second initialization signal line onto the base substrate; and/or the orthogonal projection of the second extending sub-member 2022*b* onto the base substrate at least partially overlaps with the orthogonal projection of the second initialization signal line onto the base substrate.

Illustratively, the second initialization signal line is used to transmit a second initialization signal Vinit2, and the second initialization signal Vinit2 is a stable direct current (DC) signal. The first initialization signal transmission layer 20 is used to transmit a third initialization signal Vinit3, and the third initialization signal Vinit3 is a stable DC signal.

Illustratively, the second resetting transistor is configured to reset the anode of the light-emitting element using the second initialization signal Vinit2.

Based on the above, the first extending sub-member 2022*a* and the second extending sub-member 2022*b* overlap with the second initialization signal line for transmitting the stable DC voltage signal, so it is able to further stabilize the initialization signal transmitted on the first extending sub-member 2022*a* and the second extending sub-member 2022*b*, and ensure the uniformity of the initialization signal written into each sub-pixel driving circuitry, thereby to ensure the display quality of the display substrate at a low grayscale level.

As shown in FIGS. 19 to 33, in some embodiments of the present disclosure, the display substrate further includes a second scanning line G2. The sub-pixel includes a light-emitting element, the sub-pixel driving circuitry includes a second resetting transistor, a gate electrode of the second resetting transistor is coupled to a corresponding second scanning line G2, and a second electrode of the second resetting transistor is coupled to the light-emitting element.

The first extending sub-member 2022*a* is coupled to a first electrode of the second resetting transistor in a corresponding sub-pixel driving circuitry, and the second extending sub-member 2022*b* is coupled to a first electrode of the second resetting transistor in a corresponding sub-pixel driving circuitry.

Illustratively, the first initialization signal transmission layer 20 is used to transmit the second initialization signal Vinit2.

In the embodiments of the present disclosure, the first initialization signal transmission layer 20 transmits the second initialization signal Vinit2, so as to reset the anode of the light-emitting element.

It should be appreciated that, at a low grayscale level, the resetting of the anode of the light-emitting element directly affects the luminance of the sub-pixel. In the case of display at a low brightness value, the node N4 (namely, the anode of the light-emitting element) needs to be charged for a certain time period to meet the light-emitting requirement, and at this time, a charging condition of the node N4 is mainly related to an initial voltage after the resetting (namely, the value of the second initialization signal Vinit2) and a total capacitance of the node N4. Assuming that the total capacitance of the node N4 is constant, the initial voltage after the resetting is particularly important. The higher the initial voltage, the faster the node N4 is charged to meet the light-emitting requirement. Hence, the uniformity of the voltage at the node N4 after the resetting is very important. In the embodiments of the present disclosure, the first initialization signal transmission layer 20 with lower loading is used to transmit the second initialization signal Vinit2, so it is able to ensure the uniformity of the sub-pixel driving circuitries after the resetting.

As shown in FIGS. 19 to 33, in some embodiments of the present disclosure, the second resetting transistor includes a second resetting active layer 57. Along the first direction, an orthogonal projection of a first end of the first extending sub-member 2022*a* onto the base substrate is spaced apart from an orthogonal projection of the second resetting active layer 57 coupled to the first extending sub-member 2022*a* and arranged closest to the first branch body member 2021 onto the base substrate by a third distance d3, and the first end is an end of the first extending sub-member 2022*a* close to the first branch body member 2021 coupled to the first extending sub-member 2022*a*.

Along the first direction, an orthogonal projection of a first end of the second extending sub-member 2022*b* onto the base substrate is spaced apart from an orthogonal projection of the second resetting active layer 57 coupled to the second extending sub-member 2022*b* and arranged closest to the first branch body member 2021 onto the base substrate by a fourth distance d4, the first end is an end of the second extending sub-member 2022*b* close to the first branch body member 2021 coupled to the second extending sub-member 2022*b*, and the third distance d3 is greater than the fourth distance d4.

Illustratively, the second resetting active layer 57 is used to form the first electrode, the second electrode and a channel portion of the second resetting transistor. The second resetting active layer 57 includes at least a portion extending in the second direction.

Based on the above, the first branch body member 2021 is approximately located between two columns of sub-pixel driving circuitries, so as to reduce a parasitic capacitance generated between the first branch body member 2021 and the other structures, and thereby to reduce the loading of the first branch body member 2021.

Figure 19:
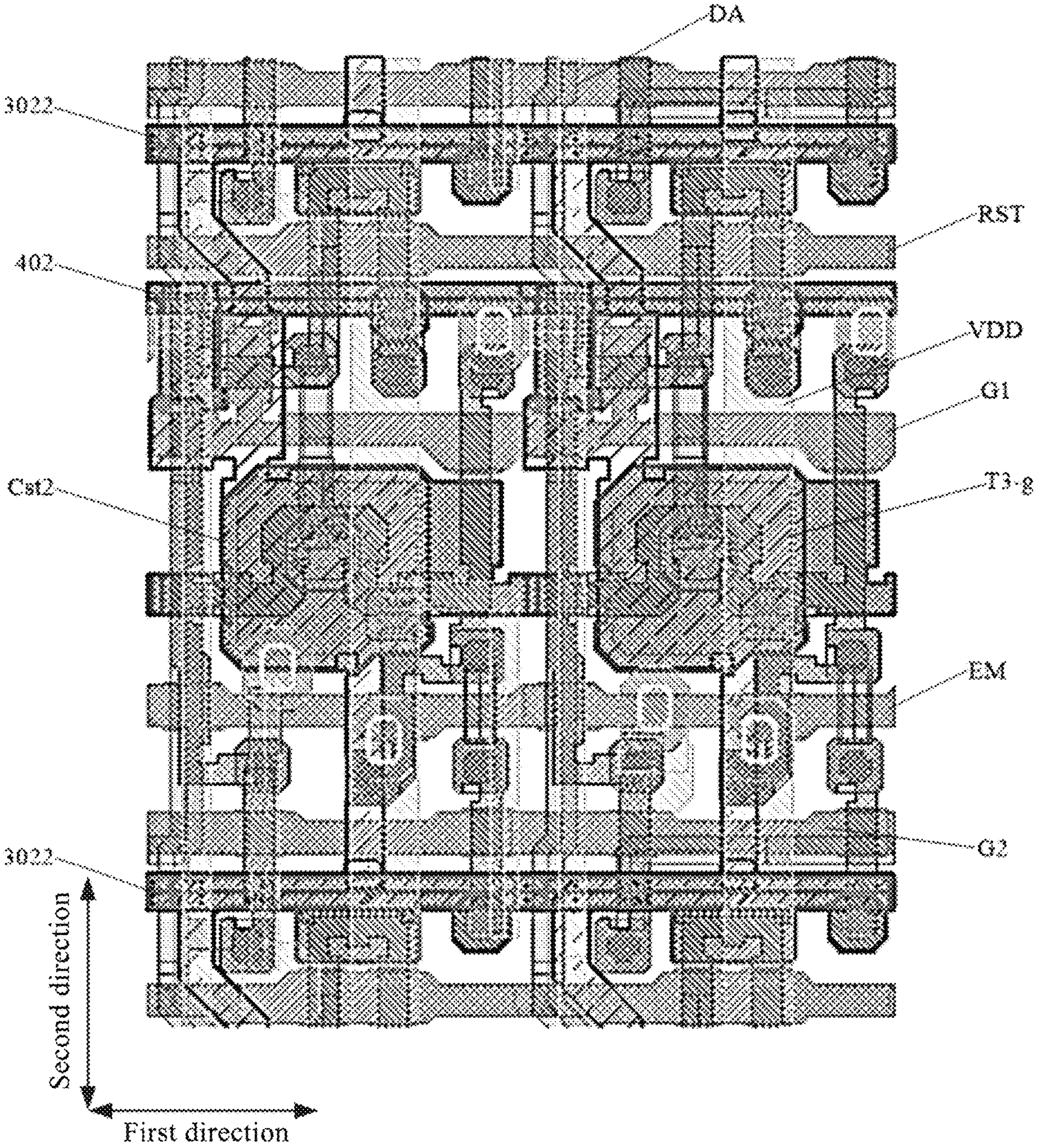
FIG. 19 is another schematic view showing the layout of two sub-pixel driving circuitries according to one embodiment of the present disclosure.
Figure 20:
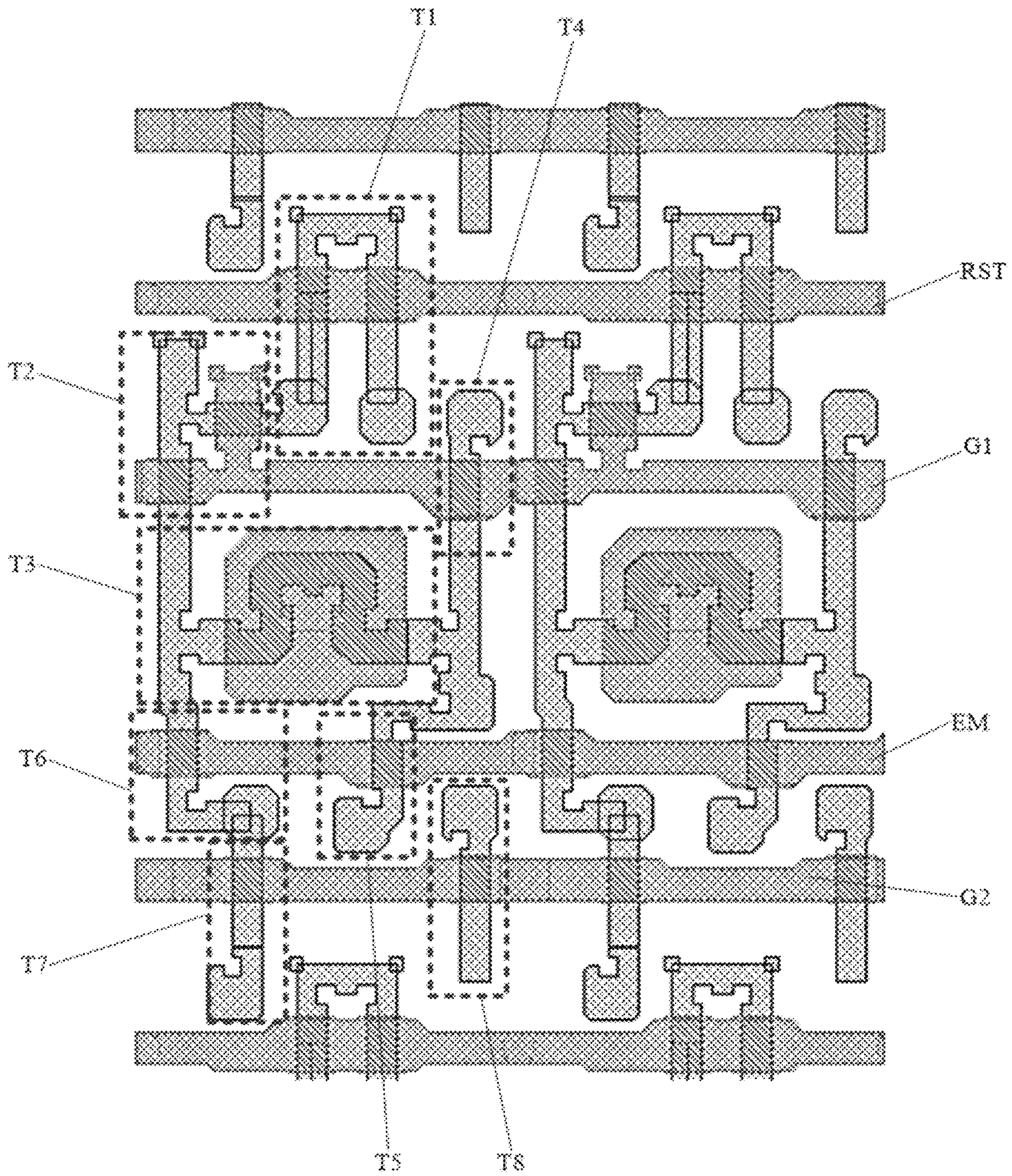
FIG. 20 is a schematic view showing the layout of an active layer and a first gate metal layer in FIG. 19.
Figure 22:
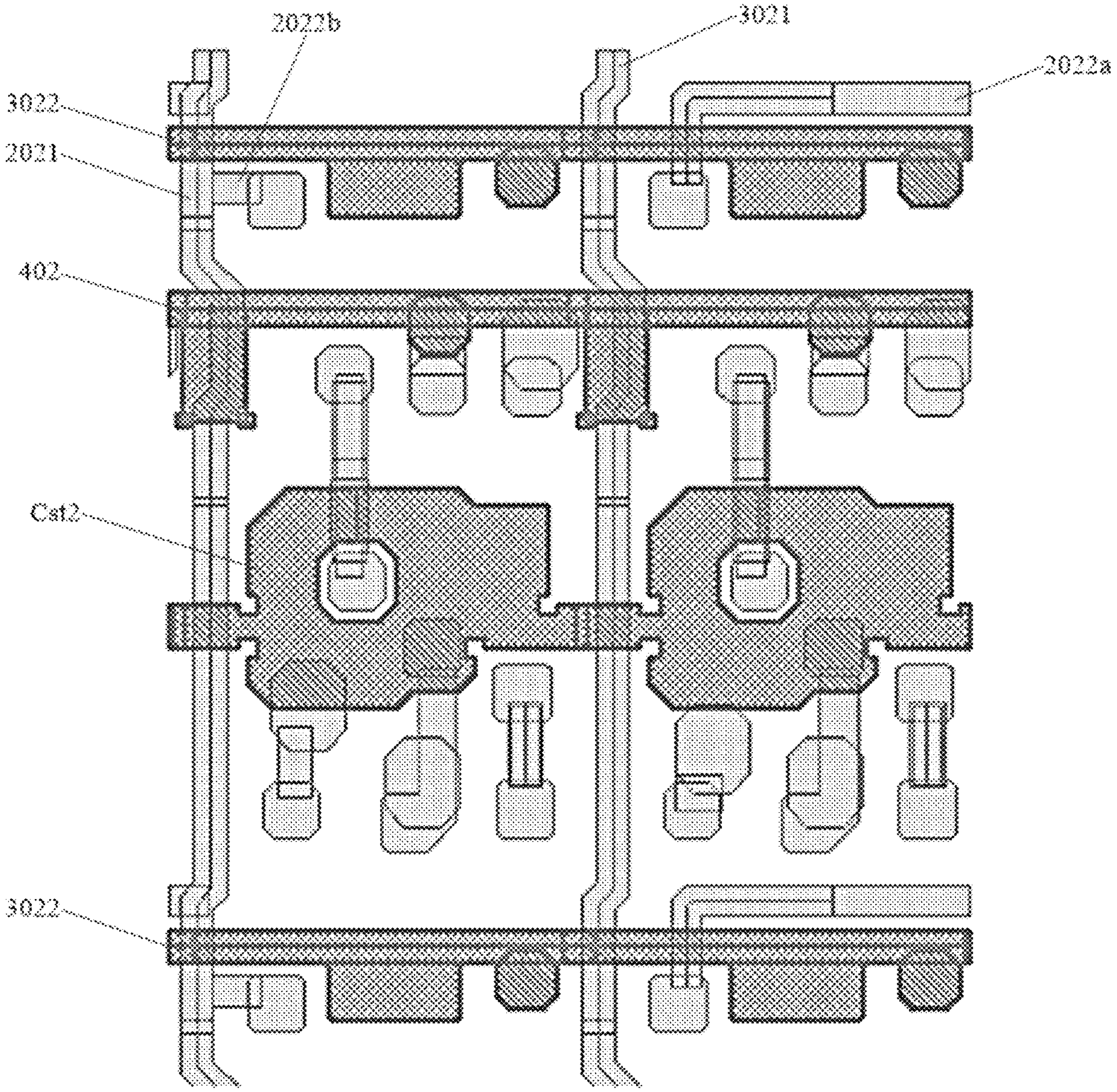
FIG. 22 is a schematic view showing the layout of the second gate metal layer and a first source/drain metal layer in FIG. 19.
Figure 23:
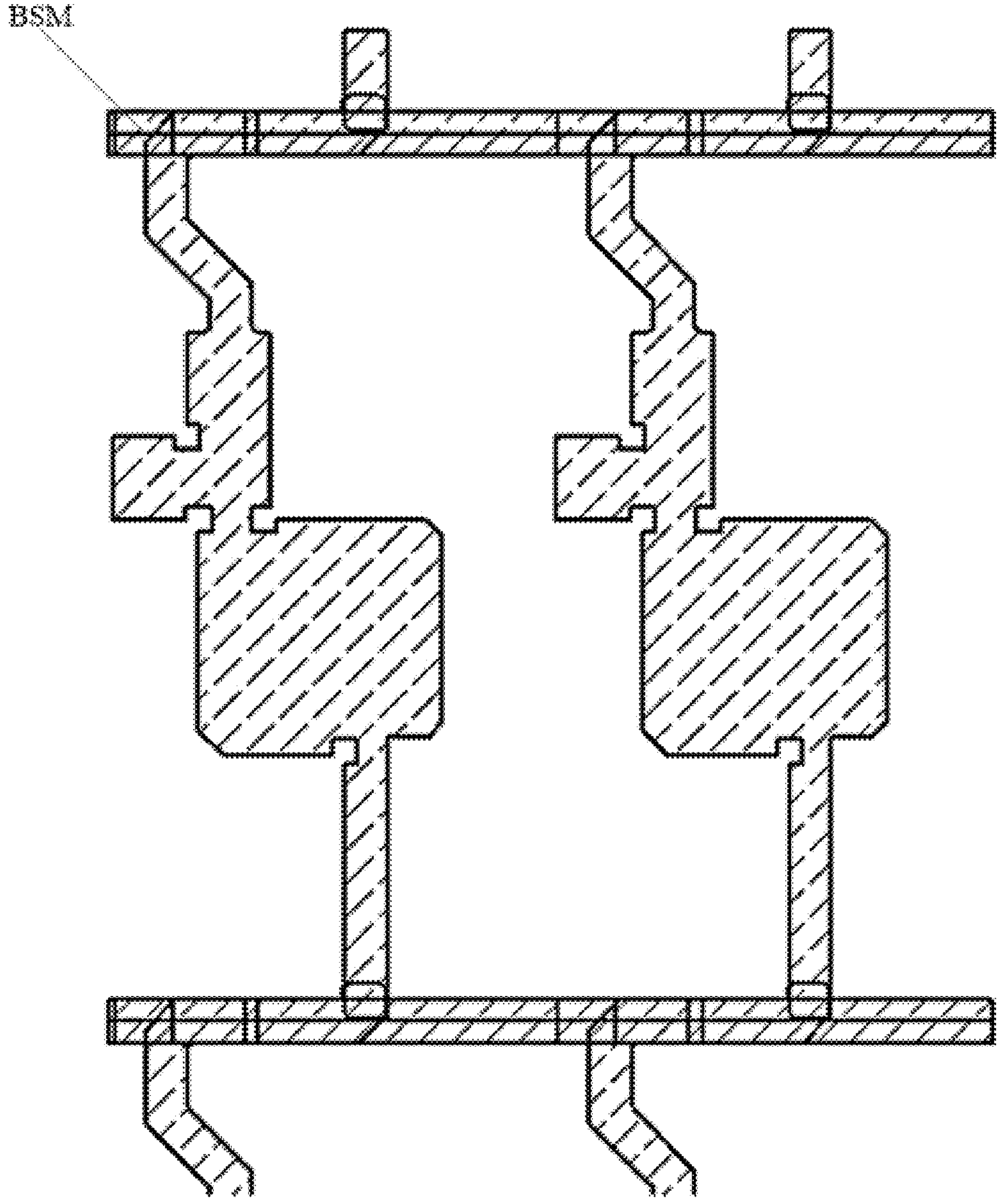
FIG. 23 is a schematic view showing the layout of a light-shielding layer in FIG. 19.

As shown in FIGS. 19, 20 and 22, in some embodiments of the present disclosure, the orthogonal projection of the first extending sub-member 2022*a* onto the base substrate partially overlaps with an orthogonal projection of the second scanning line G2 onto the base substrate; and/or the orthogonal projection of the second extending sub-member 2022*b* onto the base substrate does not overlap with the orthogonal projection of the second scanning line G2 onto the base substrate.

Based on the above, the first extending sub-member 2022*a* and the second extending sub-member 2022*b* are arranged away from the second scanning line G2 as possible in a limited layout space, so as to prevent any change in the initialization signal transmitted on the first extending sub-member 2022*a* and the second extending sub-member 2022*b* due to a signal jump on the second scanning line G2, thereby to ensure the uniformity of the initialization signal written into each sub-pixel driving circuitry.

Figure 26:
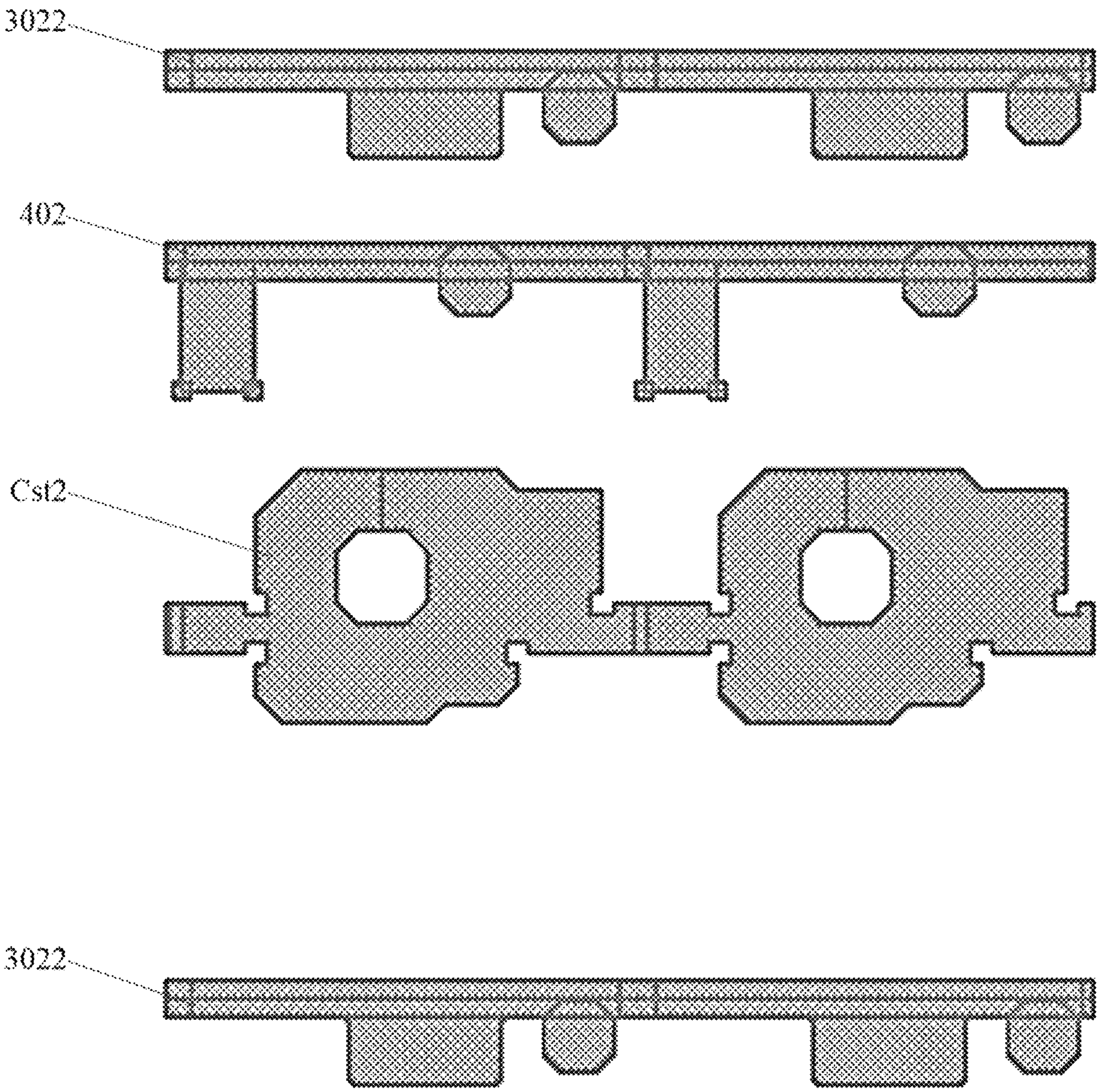
FIG. 26 is a schematic view showing the layout of the second gate metal layer in FIG. 19.
Figure 27:
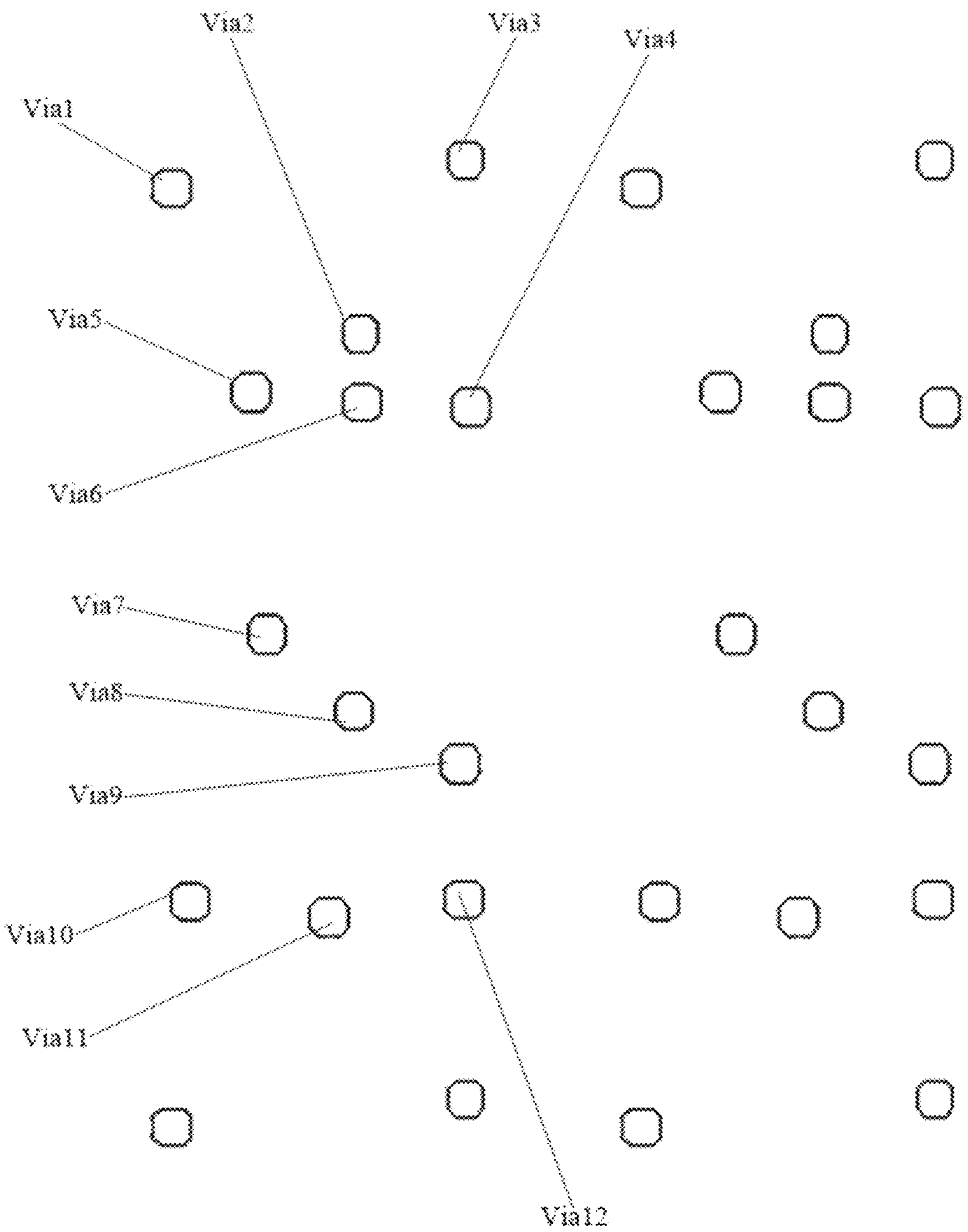
FIG. 27 is a schematic view showing the layout of a via-hole in an interlayer insulation layer in FIG. 19.

As shown in FIGS. 19-31, in some embodiments of the present disclosure, the display substrate further includes a third initialization signal line (3022 in FIG. 26). The sub-pixel driving circuitry includes a driving transistor and a third resetting transistor, a gate electrode of the third resetting transistor is coupled to a corresponding second scanning line G2, a first electrode of the third resetting transistor is coupled to the third initialization signal line, and a second electrode of the third resetting transistor is coupled to a first electrode of the driving transistor.

The orthogonal projection of the first extending sub-member 2022*a* onto the base substrate at least partially overlaps with an orthogonal projection of the third initialization signal line onto the base substrate; and/or the orthogonal projection of the second extending sub-member 2022*b* onto the base substrate does not overlap with the orthogonal projection of the second initialization signal line onto the base substrate.

Illustratively, the third initialization signal line is used to transmit a third initialization signal Vinit3, and the third initialization signal Vinit3 is a stable DC signal. The first initialization signal transmission layer 20 is used to transmit a second initialization signal Vinit2, and the second initialization signal Vinit2 is a stable DC signal.

Illustratively, the third resetting transistor is configured to reset the first electrode of the driving transistor using the third initialization signal Vinit3.

Based on the above, the first extending sub-member 2022*a* and the second extending sub-member 2022*b* overlap with the third initialization signal line for transmitting the stable DC voltage signal, so as to further stabilize the initialization signal transmitted on the first extending sub-member 2022*a* and the second extending sub-member 2022*b*, and ensure the uniformity of the initialization signal written into each sub-pixel driving circuitry, thereby to ensure the display quality of the display substrate at a low grayscale level.

Figure 28:
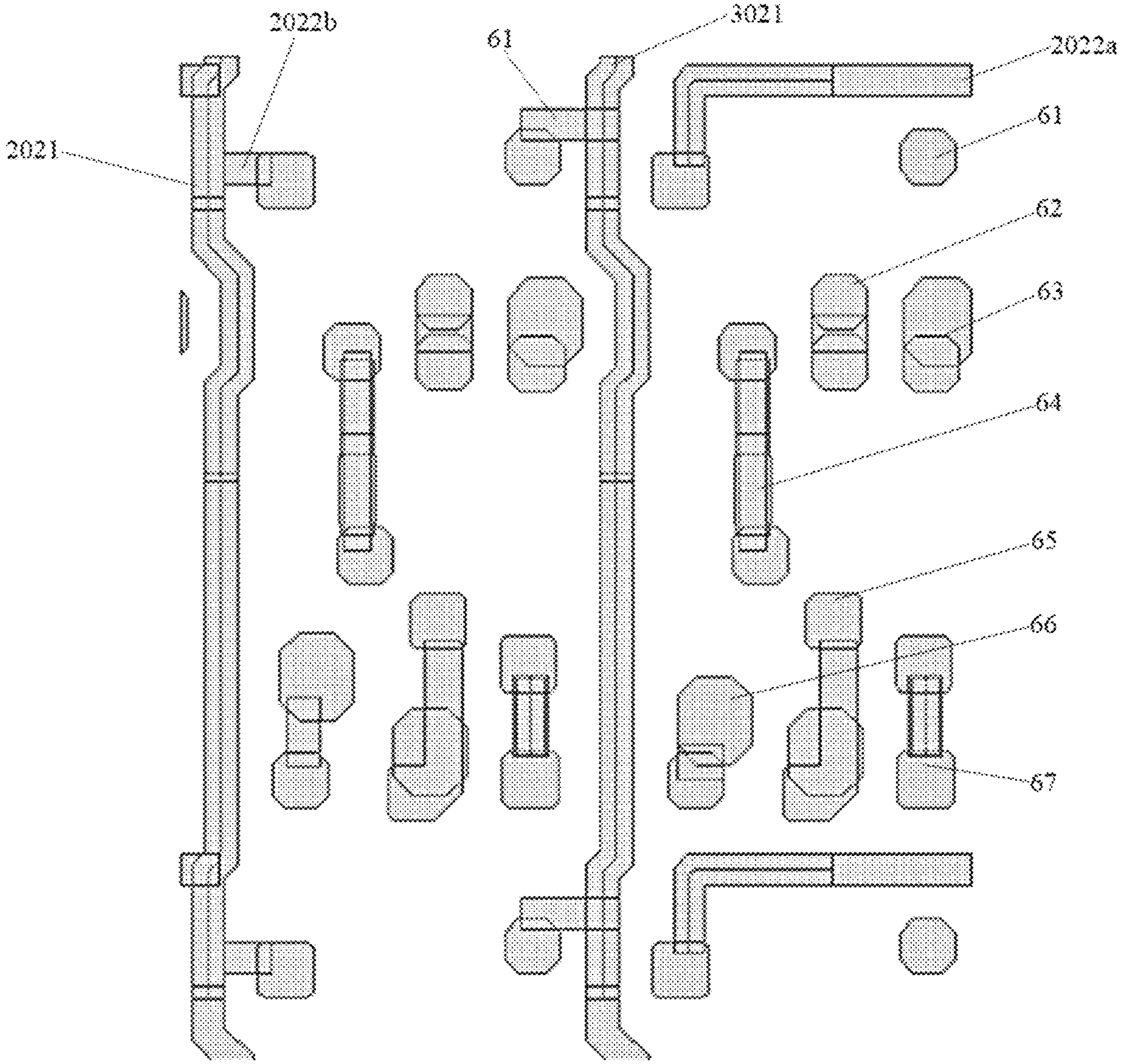
FIG. 28 is a schematic view showing the layout of the first source/drain metal layer in FIG. 19.
Figure 29:
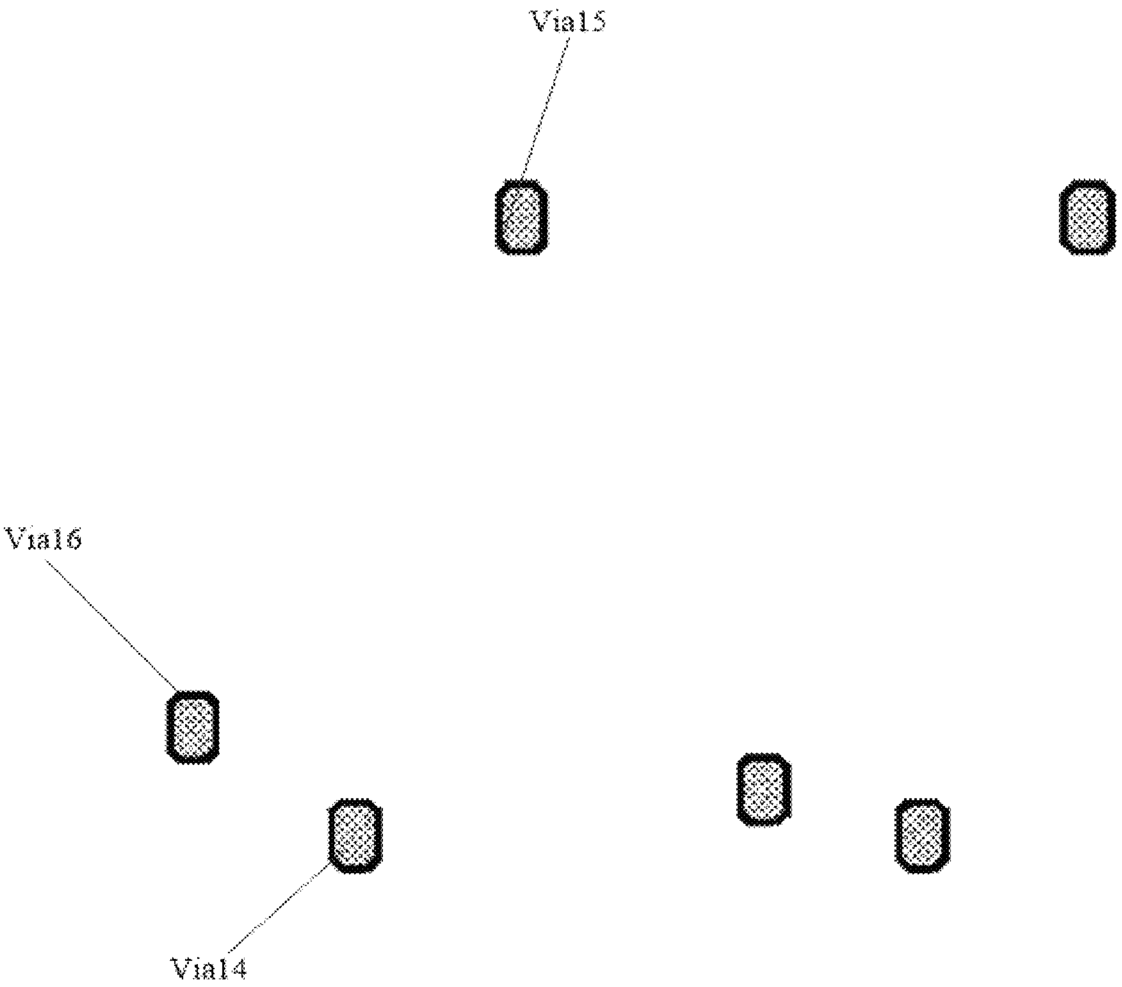
FIG. 29 is a schematic view showing the layout of a via-hole in a first planarization layer in FIG. 19.
Figure 30:
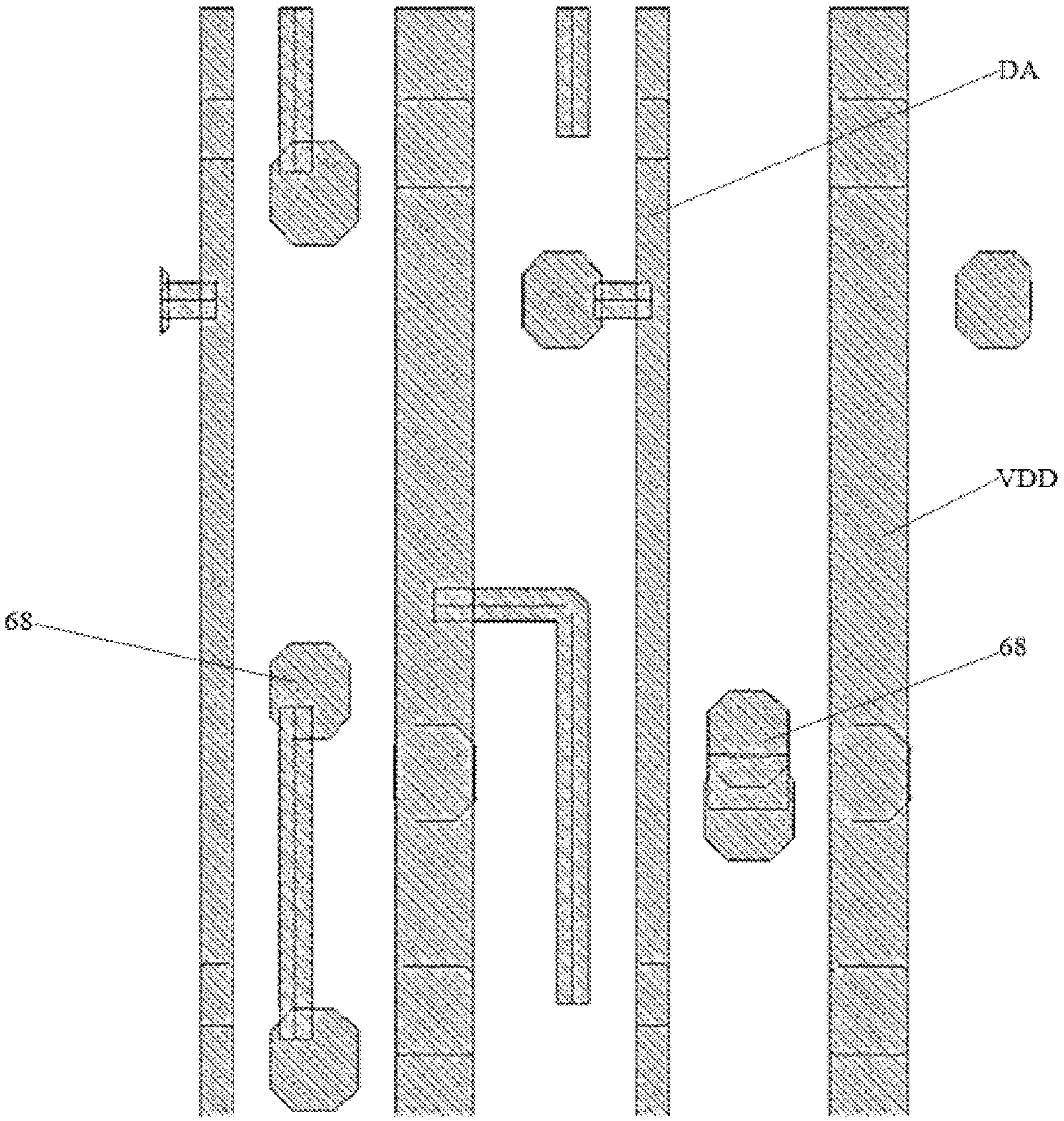
FIG. 30 is a schematic view showing the layout of the second source/drain metal layer in FIG. 19.
Figure 31:
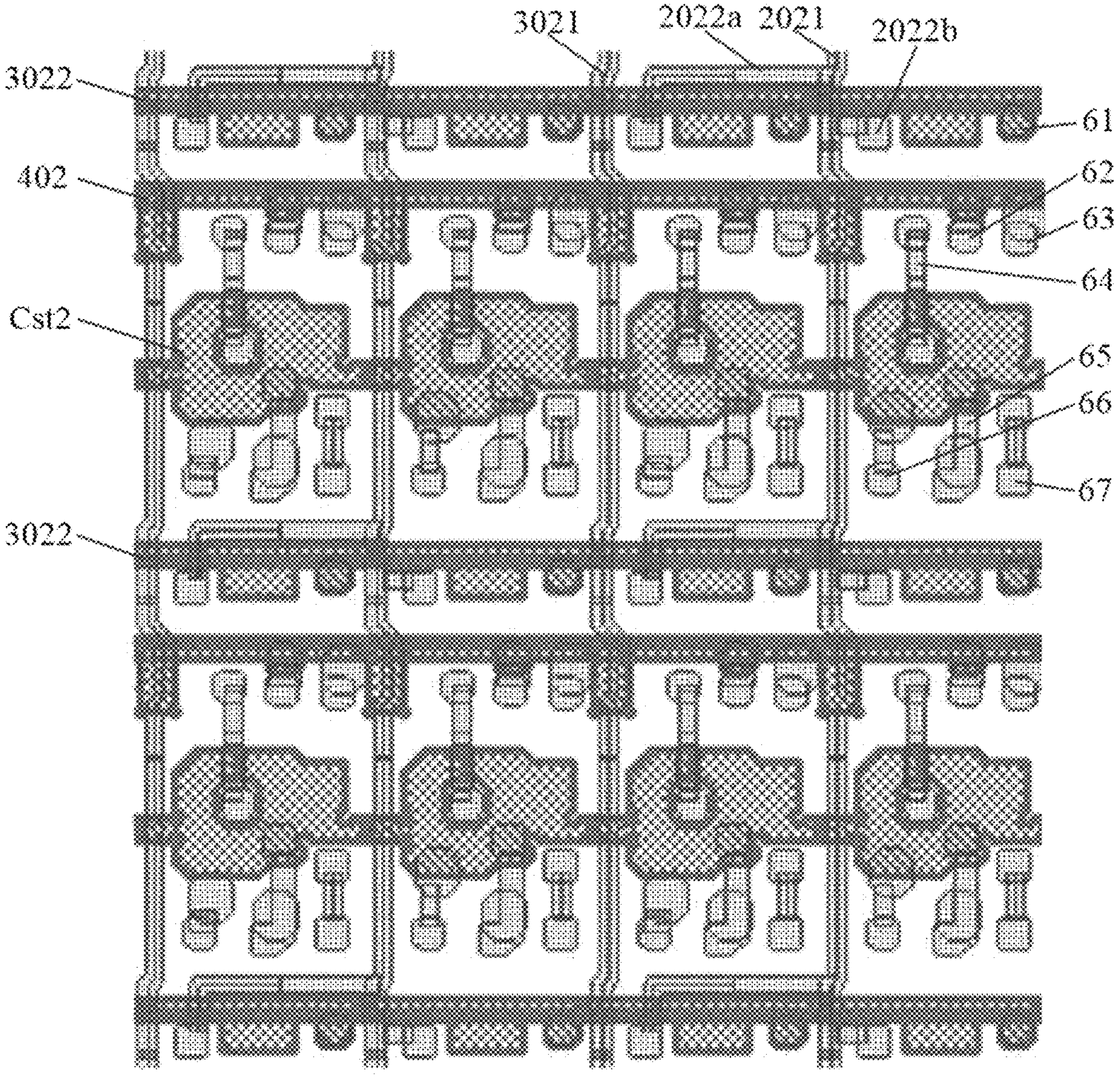
FIG. 31 is a schematic view showing the layout of the second gate metal layer in a 2*4 matrix and the first source/drain metal layer according to one embodiment of the present disclosure.
Figure 32:
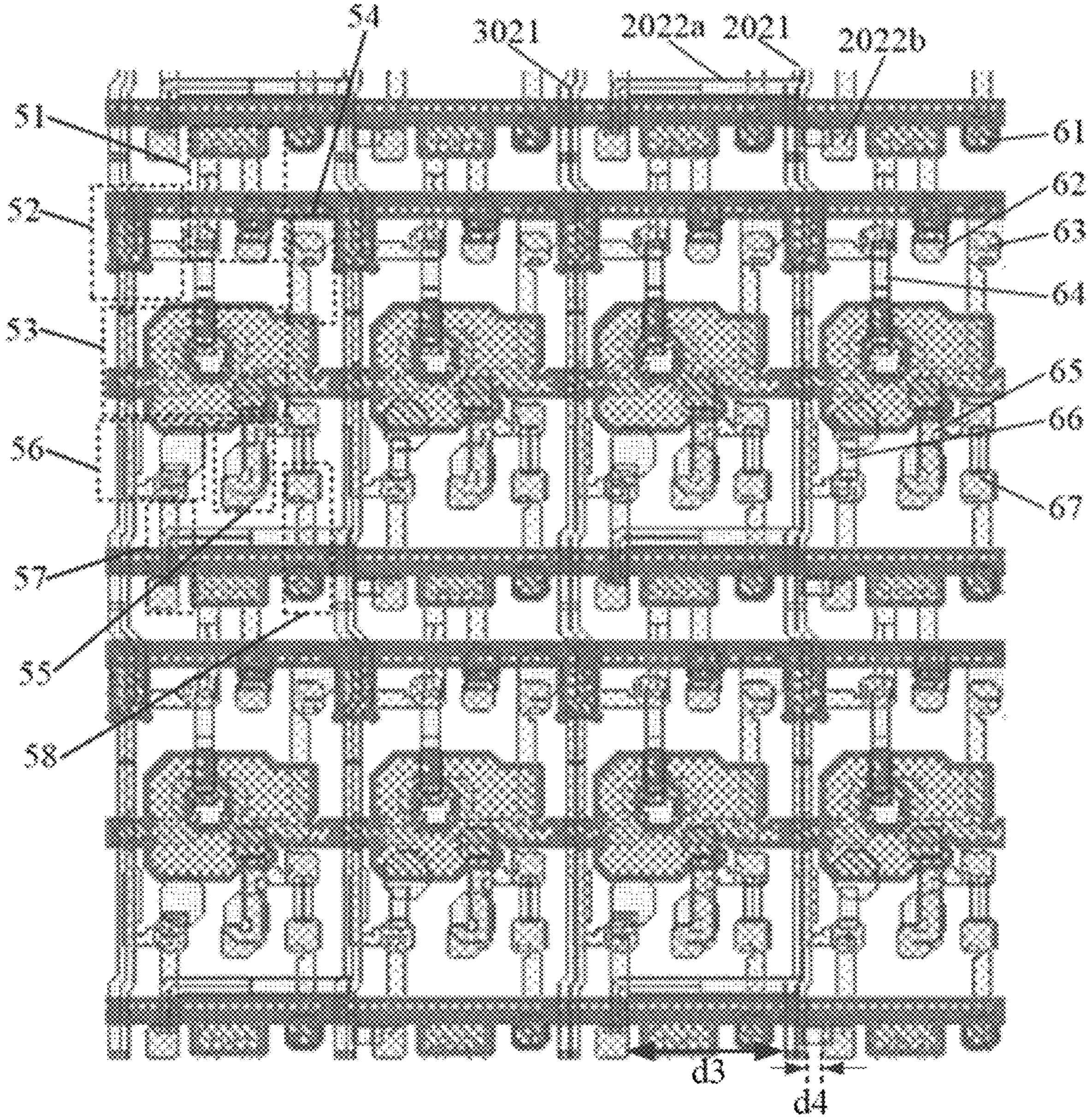
FIG. 32 is a schematic view showing the display substrate with the active layer on the basis of FIG. 31.
Figure 33:
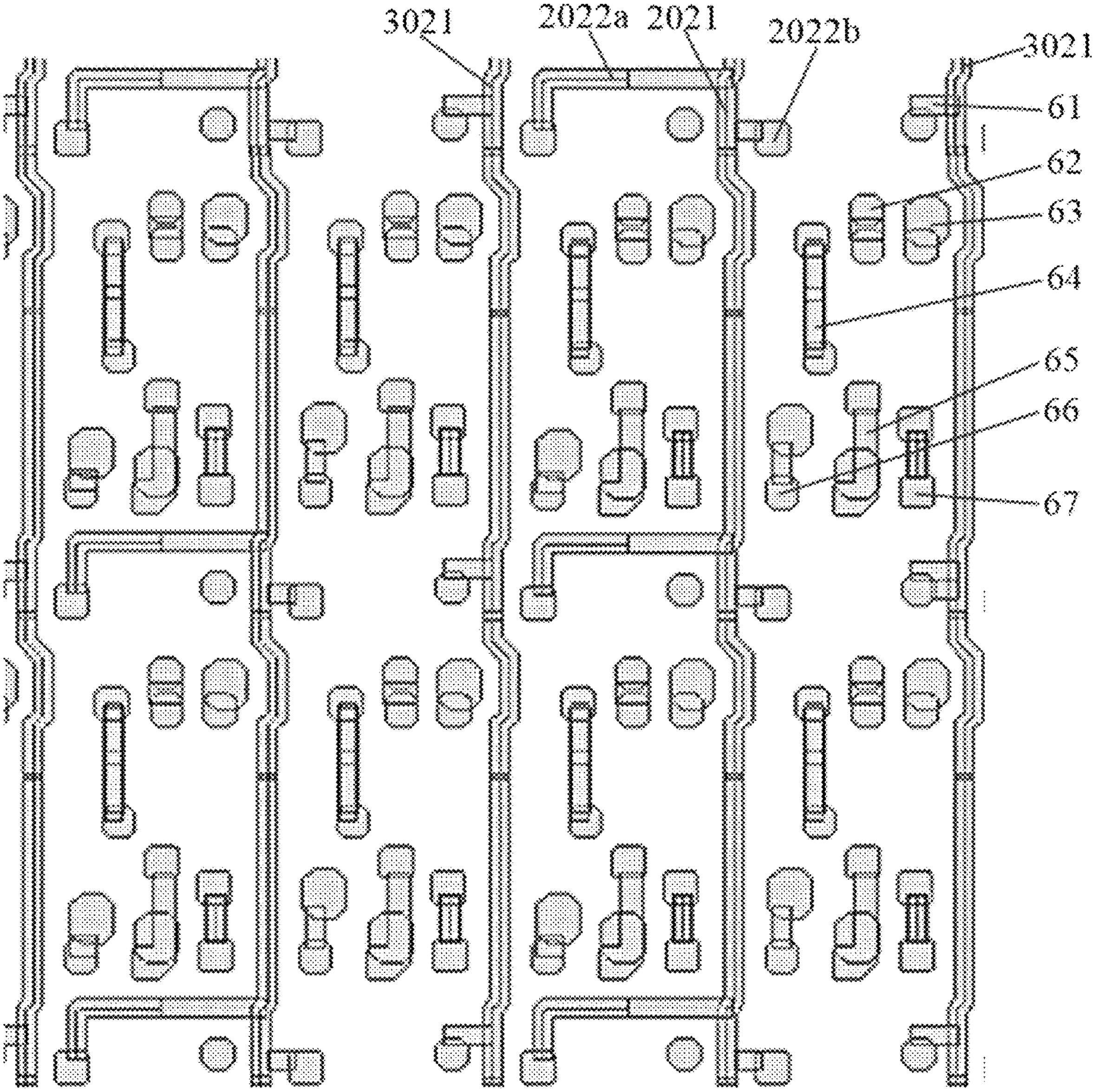
FIG. 33 is a schematic view showing the layout of the first source/drain metal layer in FIG. 31.
Figure 34:
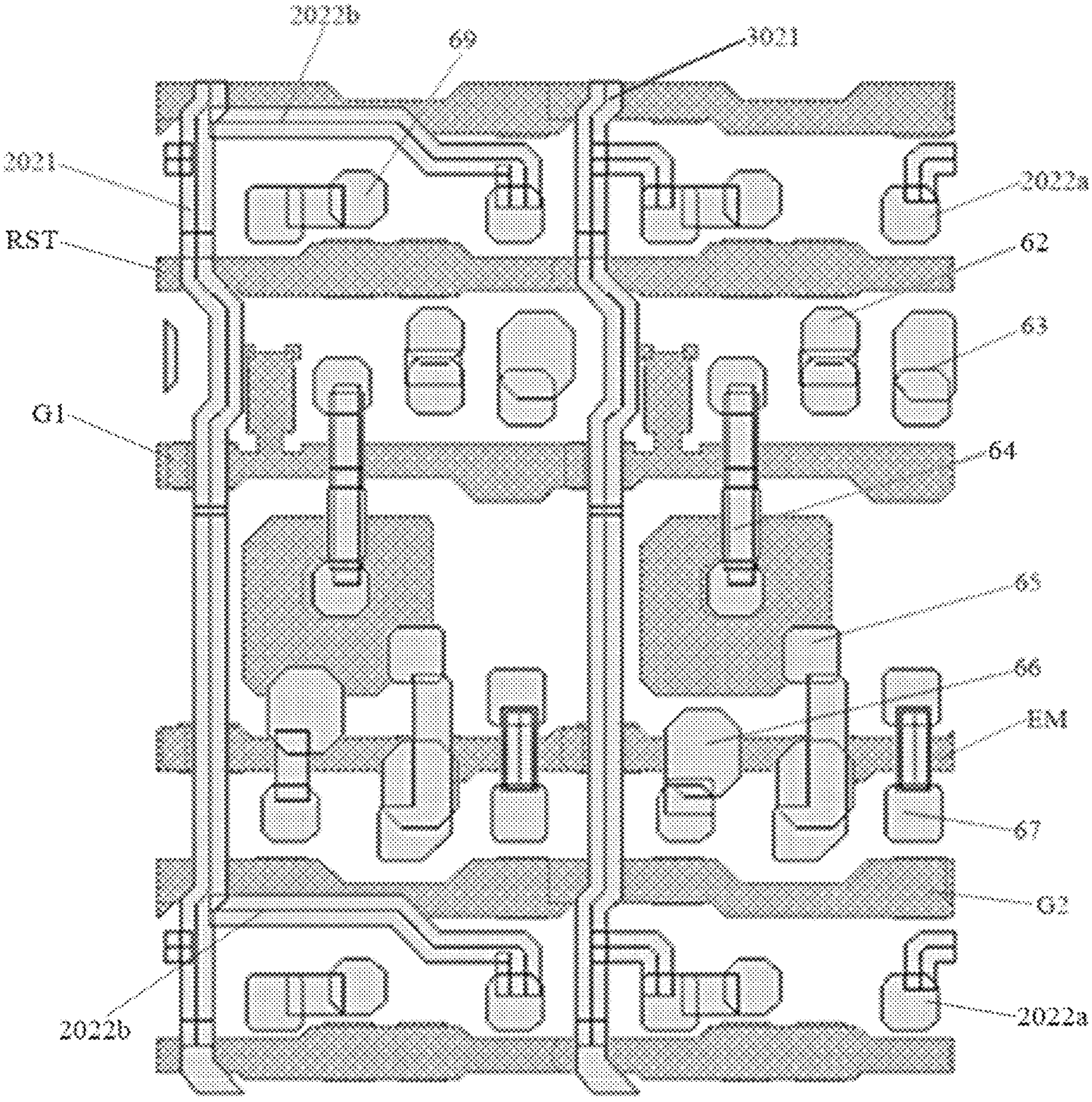
FIG. 34 is a schematic view showing the layout of the first gate metal layer and the first source/drain metal layer in FIG. 7.

As shown in FIGS. 16 and 28, in some embodiments of the present disclosure, the first branch body member 2021 and the first branch extending member 2022 form a one-piece structure. In this way, it is able to ensure the connection performance between the first branch body member 2021 and the first branch extending member 2022, and simplify the manufacturing process of the display substrate.

As shown in FIGS. 16 and 28, in some embodiments of the present disclosure, the display substrate includes a first source/drain metal layer, and the first branch body member 2021 and the first branch extending member 2022 are both arranged at a same layer and made of a same material as the first source/drain metal layer.

Based on the above, the first branch body member 2021 and the first branch extending member 2022 are formed through a same patterning process as the first source/drain metal layer, so as to simplify the manufacturing process of the display substrate and reduce the manufacture cost.

Figure 4:
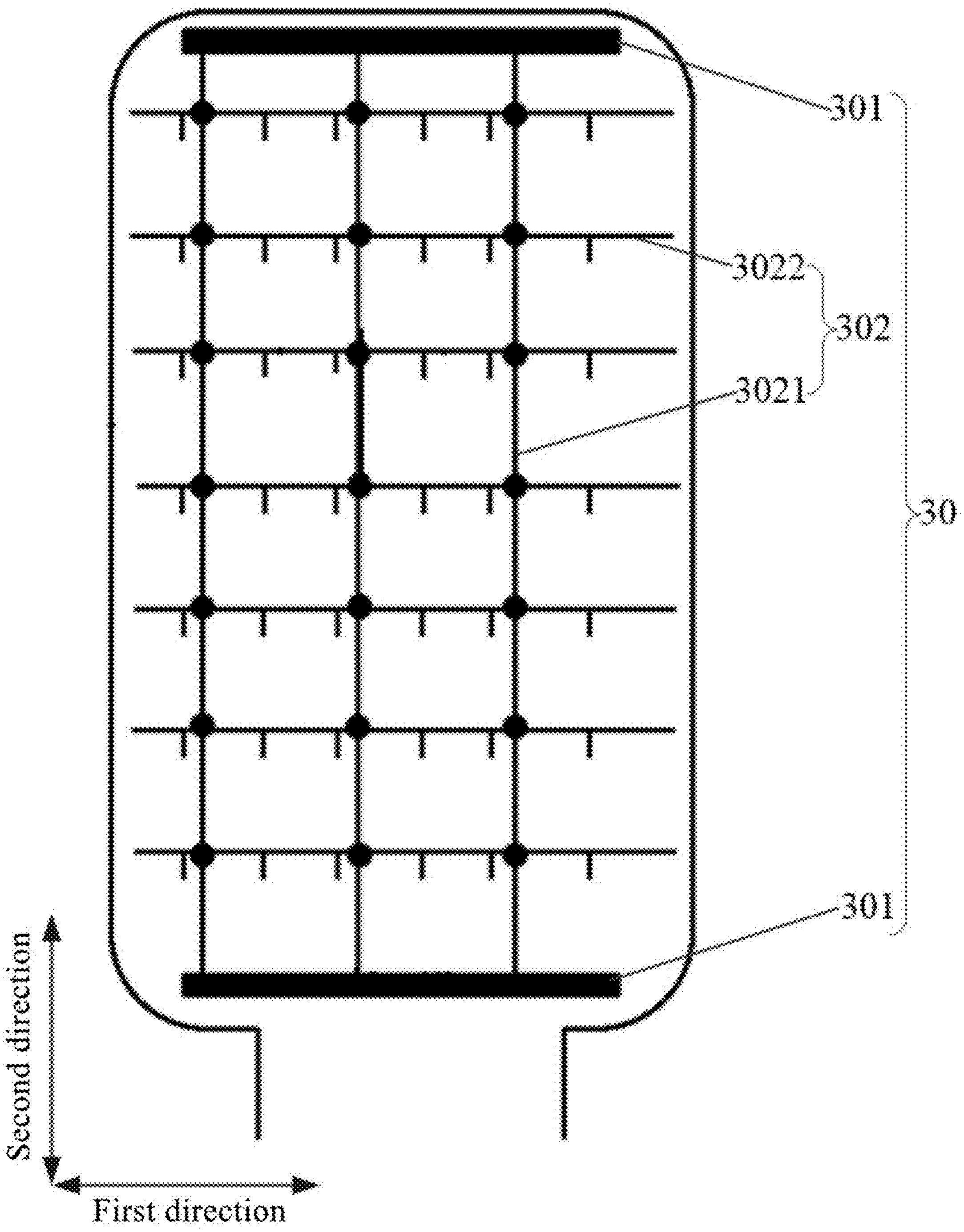
FIG. 4 is a schematic view showing a second initialization signal transmission layer according to one embodiment of the present disclosure.

As shown in FIGS. 4 and 6, in some embodiments of the present disclosure, the display substrate further includes a second initialization signal transmission layer 30 which includes two second initialization buses 301 arranged opposite to each other along the second direction and a grid-like branch 302 located between the two second initialization buses 301 and coupled to the two second initialization buses 301.

Illustratively, the two second initialization buses 301 are located in the peripheral region, one of the second initialization buses 301 is located in the upper bezel region and the other is located in the lower bezel region. It should be appreciated that, the second initialization signal transmission layer 30 may also include two second initialization buses 301 arranged opposite to each other along the first direction, one second initialization bus 301 is located in a left bezel region and the other is located in a right bezel region.

Illustratively, the second initialization signal transmission layer 30 is used to transmit, but not limited to, the second initialization signal Vinit2 or the third initialization signal Vinit3.

Based on the above, the second initialization signal transmission layer 30 includes the grid-like branch 302, so as to reduce the loading of the second initialization signal transmission layer 30. When the initialization signal is transmitted to the sub-pixel driving circuitry through the second initialization signal transmission layer 30, it is able to ensure the uniformity of the initialization signal received by each sub-pixel driving circuitry.

As shown in FIGS. 4 and 6, in some embodiments of the present disclosure, the grid-like branch 302 includes a plurality of second initialization branches 3021 arranged along the first direction and a plurality of third initialization branches 3022 arranged along the second direction, and the third initialization branches 3022 are coupled to the plurality of second initialization branches 3021 respectively.

The plurality of sub-pixel driving circuitries in the plurality of sub-pixels are arranged in rows along the second direction, and the sub-pixel driving circuitries in each row include a plurality of sub-pixel driving circuitries arranged along the first direction.

The third initialization branch 3022 is coupled to each sub-pixel driving circuitry in a corresponding row.

Illustratively, the second initialization branch 3021 includes at least a portion extending in the second direction, and the third initialization branch 3022 includes at least a portion extending in the first direction.

Illustratively, the plurality of second initialization branches 3021 is each coupled to the second initialization bus 301.

Illustratively, the quantity of second initialization branches 3021 is less than or equal to the quantity of columns of the sub-pixel driving circuitries.

Based on the above, the initialization signal is transmitted from the second initialization bus 301 to each sub-pixel driving circuitry through the second initialization branch 3021 and the third initialization branch 3022, so as to ensure the uniformity of the initialization signal received by each sub-pixel driving circuitry.

As shown in FIGS. 7 to 18, in some embodiments of the present disclosure, the display substrate further includes a second scanning line G2. The sub-pixel includes a light-emitting element, the sub-pixel driving circuitry includes a second resetting transistor, a gate electrode of the second resetting transistor is coupled to a corresponding second scanning line G2, and a second electrode of the second resetting transistor is coupled to the light-emitting element. The third initialization branch 3022 is coupled to a first electrode of a second resetting transistor in each sub-pixel driving circuitry in a corresponding row.

Illustratively, the second initialization signal line transmission layer is used to transmit a second initialization signal Vinit2.

In the embodiments of the present disclosure, the second initialization signal transmission layer 30 is used transmit the second initialization signal Vinit2, so as to reset the anode of the light-emitting element.

As shown in FIGS. 19 to 33, in some embodiments of the present disclosure, the display substrate further includes a second scanning line G2. The sub-pixel driving circuitry includes a driving transistor and a third resetting transistor, a gate electrode of the third resetting transistor is coupled to a corresponding second scanning line G2, and a second electrode of the third resetting transistor is coupled to a first electrode of the driving transistor. The third initialization branch 3022 is coupled to a first electrode of the third resetting transistor in each sub-pixel driving circuitry in a corresponding row.

Illustratively, the second initialization signal transmission layer 30 is used to transmit a third initialization signal Vinit3, and the third resetting transistor is configured to reset the first electrode of the driving transistor through the third initialization signal Vinit3.

Based on the above, the second initialization signal transmission layer 30 is used to transmit the third initialization signal Vinit3, so as to reset the first electrode of the driving transistor.

As shown in FIG. 22, in some embodiments of the present disclosure, the display substrate further includes a second gate metal layer and a first source/drain metal layer, the second initialization branch 3021 is arranged at a same layer and made of a same material as the first source/drain metal layer, and the third initialization branch 3022 is arranged at a same layer and made of a same material as the second gate metal layer.

Based on the above, the second initialization branch 3021 and the first source/drain metal layer are formed through a same patterning process, and the third initialization branch 3022 and the second gate metal layer are formed through a same patterning process, so as to simplify the manufacturing process of the display substrate and reduce the manufacture cost.

In some embodiments of the present disclosure, in the first direction, orthogonal projections of a first branch body members 2021 onto the base substrate and orthogonal projections of b second initialization branches 3021 onto the base substrate are arranged alternately, where a is an integer greater than or equal to 1, and b is an integer greater than or equal to 1.

Illustratively, the quantity of the first branch body members 2021 is less than the quantity of columns of the sub-pixel driving circuitries, and the quantity of the second initialization branches 3021 is less than the quantity of columns of the sub-pixel driving circuitries.

Based on the above, the a first branch body members 2021 and b second initialization branches 3021 are arranged alternately along the first direction, so it is able to reduce the layout difficulty of the first initialization signal transmission layer 20 and the second initialization signal transmission layer 30 while ensuring the normal signal transmission.

Figure 3:
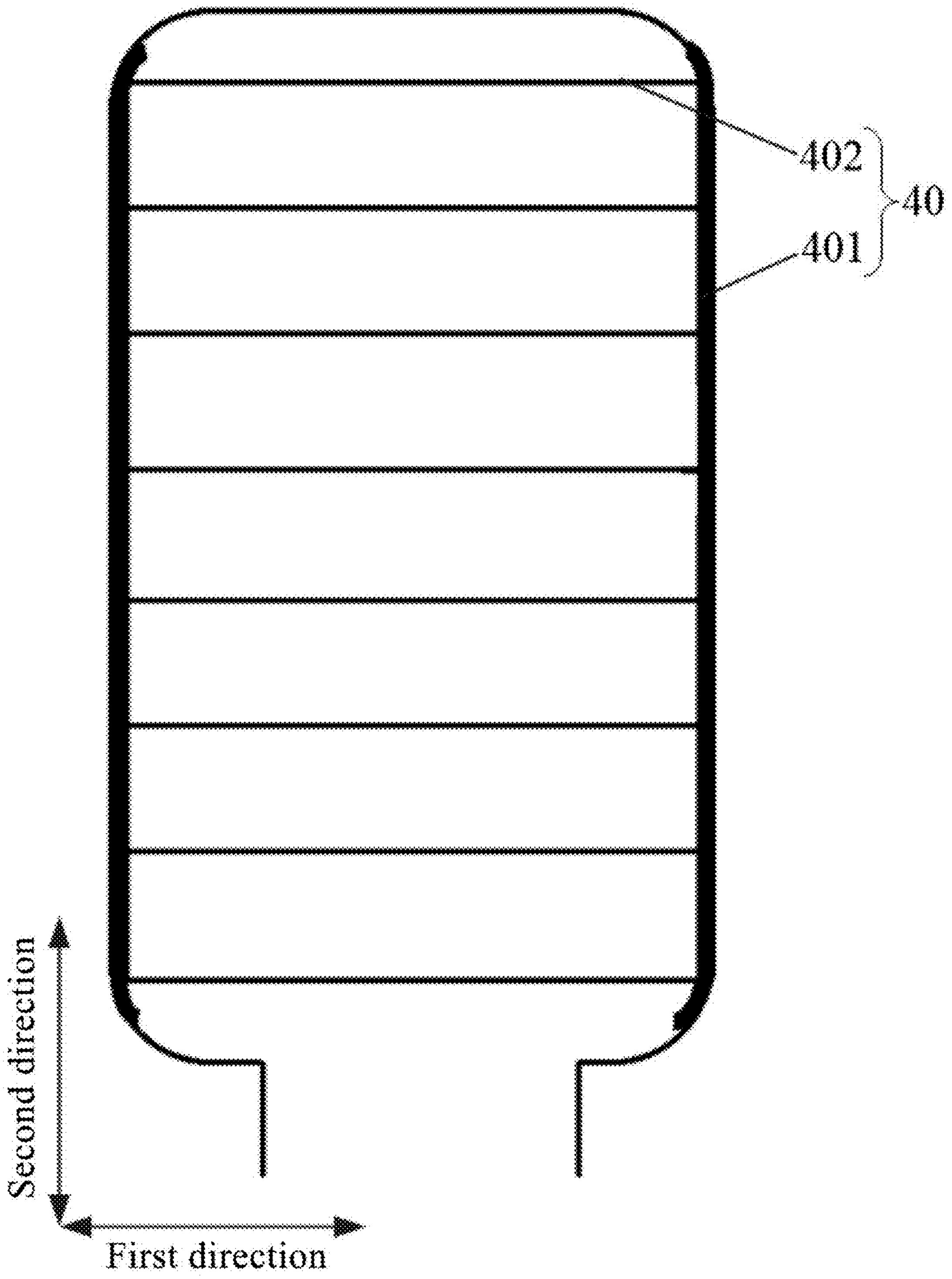
FIG. 3 is a schematic view showing a third initialization signal transmission layer according to one embodiment of the present disclosure.

As shown in FIG. 3, in some embodiments of the present disclosure, the display substrate further includes a third initialization signal transmission layer 40, which includes a third initialization bus 401 and a plurality of fourth initialization branches 402 coupled to the third initialization bus 401. The sub-pixel driving circuitry includes a driving transistor and a first resetting transistor, a first electrode of the first resetting transistor is coupled to a corresponding fourth initialization branch 402, and a second electrode of the first resetting transistor is coupled to a gate electrode of the driving transistor.

Illustratively, the third initialization signal transmission layer 40 is used to transmit the first initialization signal Vinit1, and the first resetting transistor is used to reset the gate electrode of the driving transistor using the first initialization signal Vinit1.

The first initialization signal Vinit1 functions as to reset the voltage at the node N1 (namely, the gate electrode of the driving transistor). When the non-uniformity of the voltage at the node N1 occurs within a resetting phase, an initial voltage at the node NI is different when a data signal is written within a next phase. When the data signal is written into the sub-pixels at a same speed, there is a difference between the voltages at the node NI after the writing of the data signal. Actually, the data signals are written at different speeds, and theoretically the voltage at the node N1 after the writing of the data signal is "Vdata+Vth", where Vdata is the voltage of the data signal and Vth is a threshold voltage. In a word, the loading of the first initialization signal Vinit1 may influence the voltage at the node N1 to some extent.

Based on the above, the third initialization signal transmission layer 40 includes the third initialization bus 401 and the fourth initialization branch 402, so it is able to reduce the loading of the third initialization signal transmission layer 40, and ensure the uniformity of the first initialization signal Vinit1 written into each sub-pixel region driving circuitry.

As shown in FIG. 3, in some embodiments of the present disclosure, the third initialization signal transmission layer 40 includes two third initialization buses 401 arranged opposite to each other along the first direction, and the plurality of fourth initialization branches 402 is arranged along the second direction and coupled to the two third initialization buses 401. The fourth initialization branch 402 is coupled to each sub-pixel driving circuitry in a corresponding row.

Illustratively, one of the two first initialization buses 201 is located in the left bezel region and the other is located in the right bezel region.

Illustratively, the fourth initialization branch 402 includes at least a portion extending in the first direction.

Illustratively, the plurality of fourth initialization branches 402 correspond to the plurality of rows of sub-pixel driving circuitries respectively.

Based on the above, it is able to reduce the layout difficulty of the third initialization signal transmission layer 40, reduce the loading of the third initialization signal transmission layer 40, and ensure the uniformity of the first initialization signal Vinit1 written into each sub-pixel region driving circuitry.

In some embodiments of the present disclosure, the fourth initialization branch 402 includes a fourth branch body member and a fourth branch protruding member, the fourth branch body member extends in the first direction, and the fourth branch protruding member protrudes from the fourth branch body member in the second direction.

Figure 21:
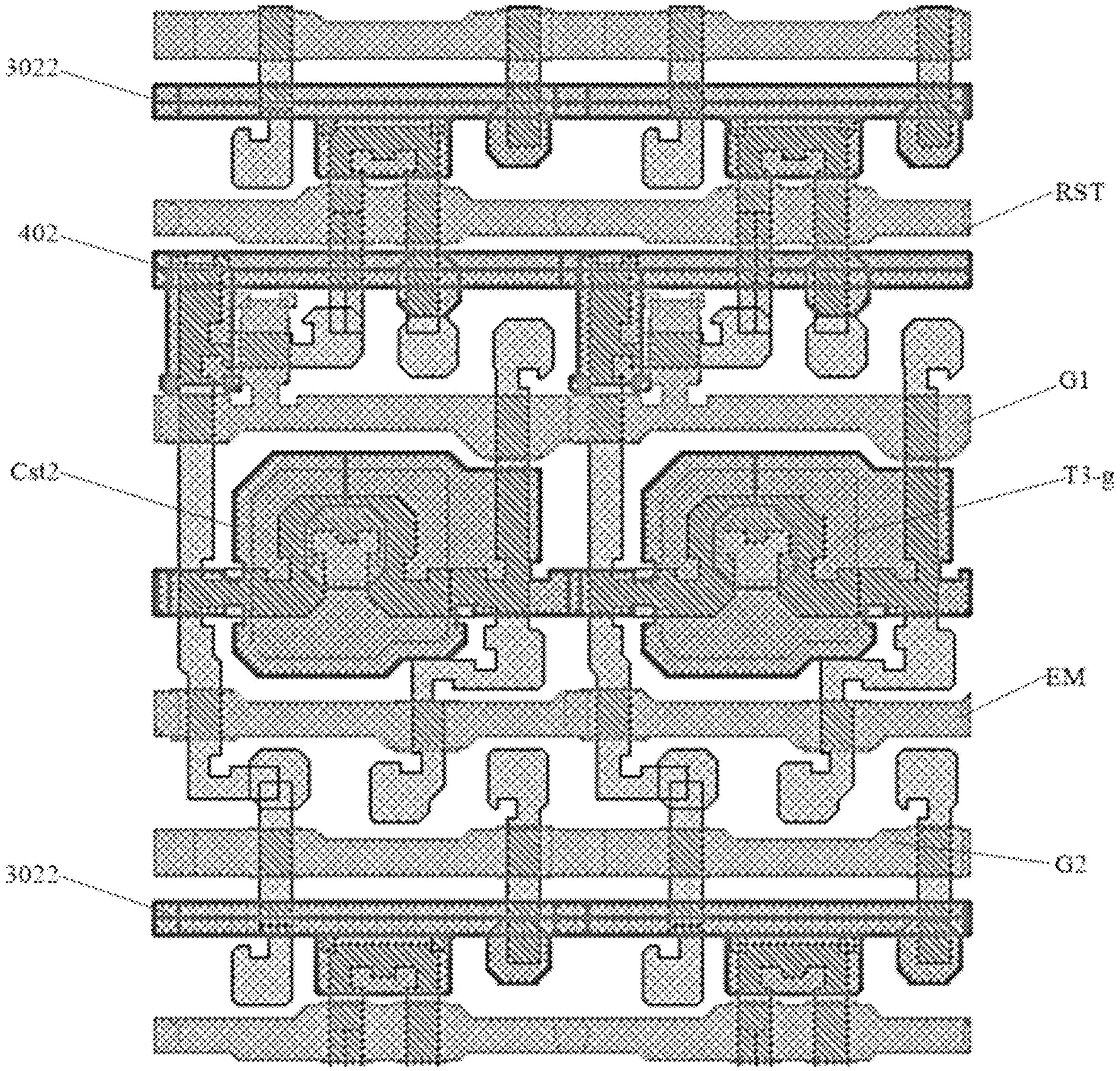
FIG. 21 is a schematic view showing the layout of the active layer, the first gate metal layer and a second gate metal layer in FIG. 19.
Figure 24:
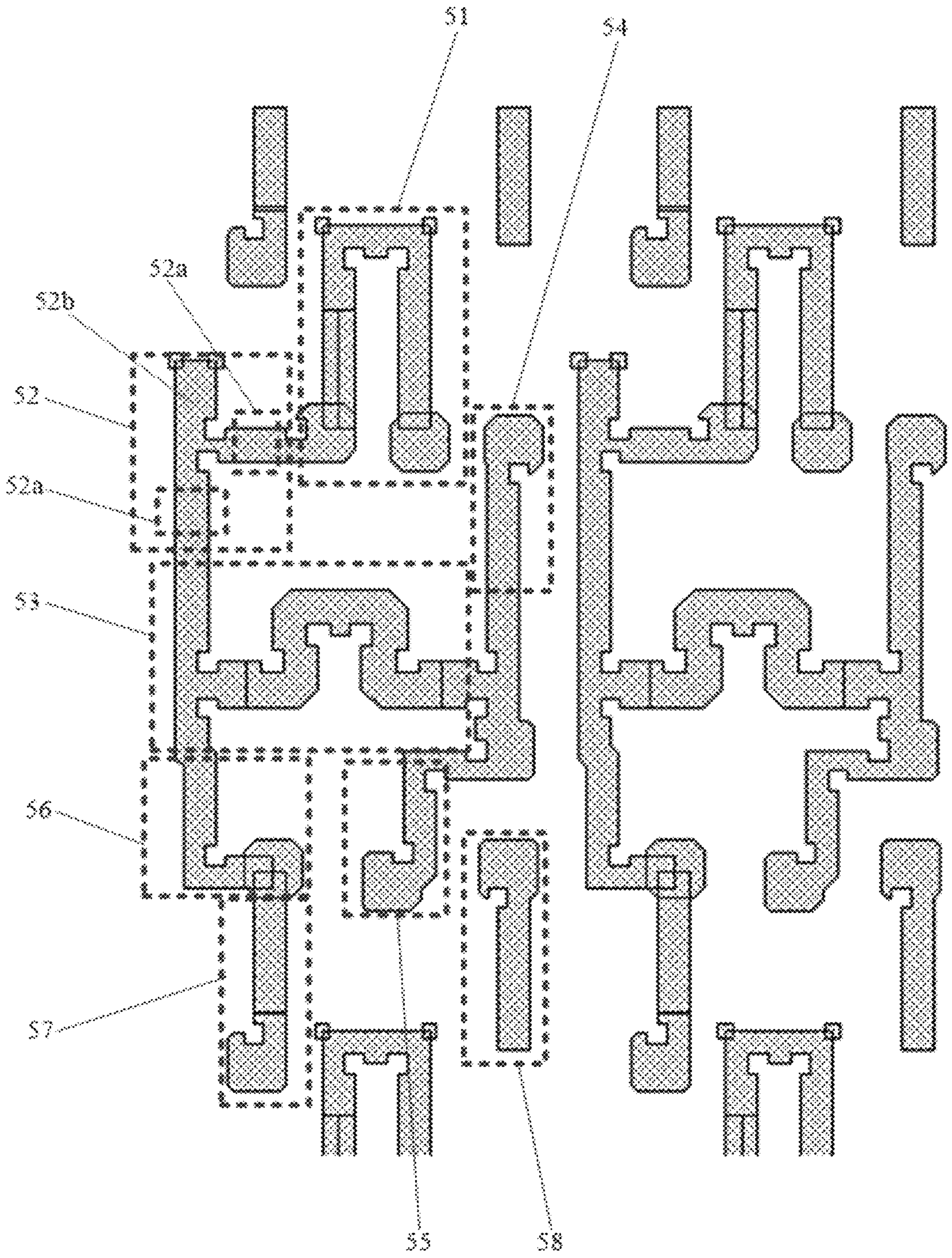
FIG. 24 is a schematic view showing the layout of the active layer in FIG. 19.
Figure 25:
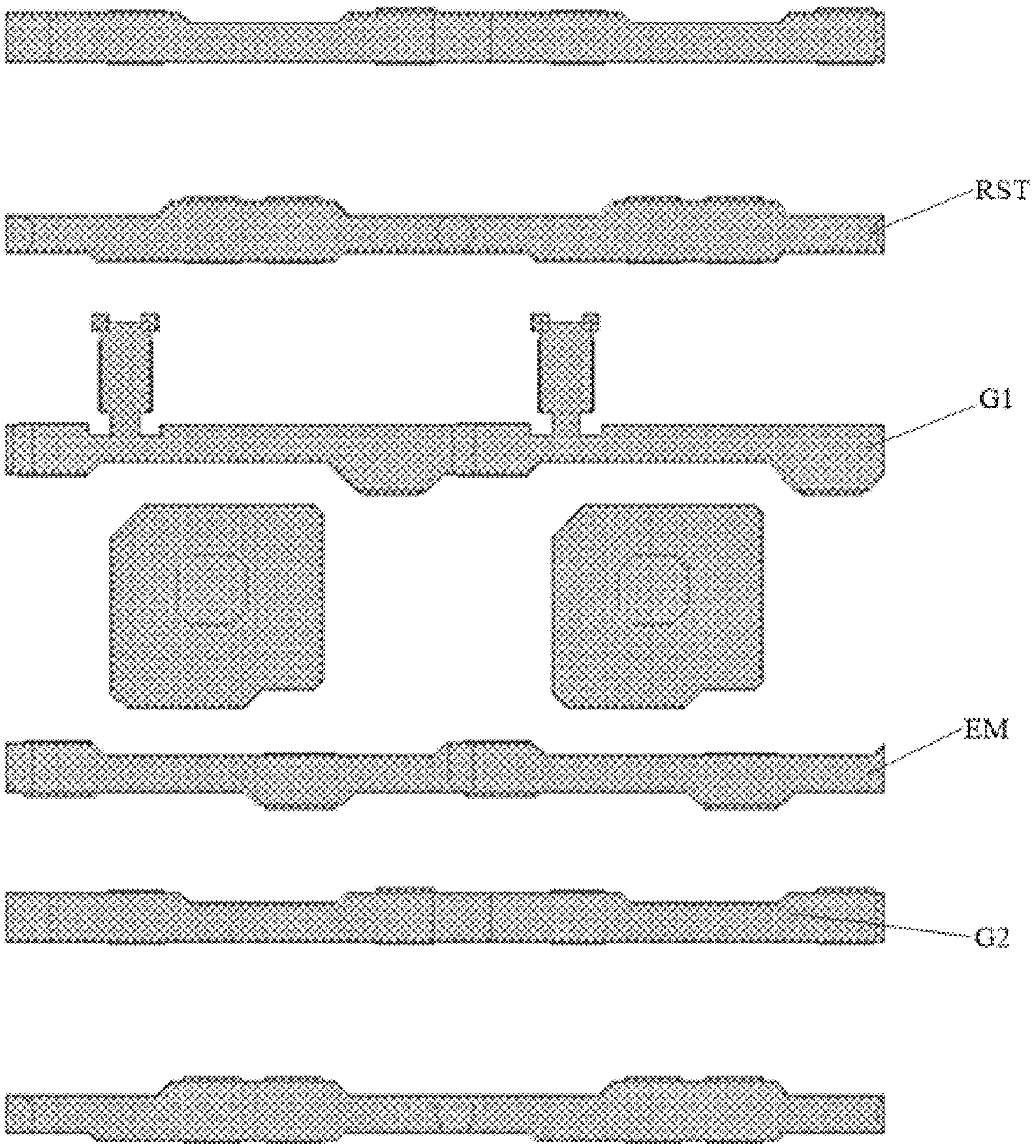
FIG. 25 is a schematic view showing the layout of the first gate metal layer in FIG. 19.

As shown in FIGS. 21 and 24, the sub-pixel driving circuitry includes a driving transistor and a compensation transistor, a first electrode of the compensation transistor is coupled to a second electrode of the driving transistor, and a second electrode of the compensation transistor is coupled to a gate electrode of the driving transistor. The compensation transistor includes a compensation active layer 52, the compensation active layer 52 includes two channel portions 52*a* and conductor portions 52*b* coupled to the two channel portions 52*a* respectively. An orthogonal projection of the conductor portion 52*b* onto the base substrate at least partially overlaps with an orthogonal projection of the fourth branch protruding member onto the base substrate.

Illustratively, the fourth branch body member includes at least a portion extending in the first direction.

Illustratively, the compensation transistor includes a double-gate transistor. Orthogonal projections of the two channel portions 52*a* onto the base substrate overlap with an orthogonal projection of the gate electrode of the compensation transistor onto the base substrate, and an orthogonal projection of the conductor portion 52*b* onto the base substrate does not overlap with the orthogonal projection of the gate electrode of the compensation transistor onto the base substrate.

Illustratively, an orthogonal projection of the fourth branch protruding member onto the base substrate covers the orthogonal projection of the conductor portion 52*b* onto the base substrate.

Based on the above, it is able to shield the conductor portion 52*b* through the fourth branch protruding member, and prevent the occurrence of a characteristic drift for the conductor portion 52*b* due to irradiation, thereby to prevent a leakage current of the compensation transistor from increasing.

Furthermore, a capacitor is formed between the fourth branch protruding member and the conductor portion 52*b*, so as to stabilize the voltage of the conductor portion 52*b*, thereby to improve the flicker and ensure a display effect at a low frequency.

As shown in FIG. 3, in some embodiments of the present disclosure, the third initialization signal transmission layer 40 includes two third initialization buses 401 arranged opposite to each other along the second direction, the plurality of fourth initialization branches 402 is arranged along the first direction, and the fourth initialization branches 402 are coupled to the two third initialization buses 401. The fourth initialization branch 402 is coupled to each sub-pixel driving circuitry in a corresponding column.

Illustratively, one of the two third initialization buses 401 is located in the upper bezel region and the other is located in the lower bezel region.

Illustratively, the fourth initialization branch 402 includes at least a portion extending in the second direction.

Illustratively, the plurality of fourth initialization branches 402 corresponds to the columns of sub-pixel driving circuitries respectively.

Based on the above, it is able to reduce the layout difficulty of the third initialization signal transmission layer 40, reduce the loading of the third initialization signal transmission layer 40, and ensure the uniformity of the first initialization signal Vinit1 written into each sub-pixel region driving circuitry.

In some embodiments of the present disclosure, along the first direction, orthogonal projections of a first branch body members 2021 onto the base substrate, orthogonal projections of b second initialization branches 3021 onto the base substrate, and orthogonal projections of c fourth initialization branches 402 onto the base substrate are arranged alternatively, where a is an integer greater than or equal to 1, b is an integer greater than or equal to 1, and c is an integer greater than or equal to 1.

Illustratively, the quantity of the first branch body members 2021 is less than the quantity of the columns of the sub-pixel driving circuitries, the quantity of the second initialization branches 3021 is less than the quantity of the columns of the sub-pixel driving circuitries, and the quantity of the fourth initialization branches 402 is less than the quantity of the columns of the sub-pixel driving circuitries.

Based on the above, when the a first branch body members 2021, b second initialization branches 3021 and c fourth initialization branches 402 are arranged alternately along the first direction, it is able to reduce the layout difficulty of the first initialization signal transmission layer 20, the second initialization signal transmission layer 30 and the third initialization signal transmission layer 40 while ensuring the normal signal transmission.

In some embodiments of the present disclosure, the third initialization signal transmission layer 40 includes four third initialization buses 401. Two third initialization buses 401 are arranged along the first direction and located in the upper frame region and the lower frame region respectively, and the other two third initialization buses 401 are arranged along the second direction and located in the left frame region and the right frame region respectively. The third initialization signal transmission layer 40 includes grid-like fourth initialization branches 402 coupled to the four third initialization buses 401 respectively.

Figure 2:
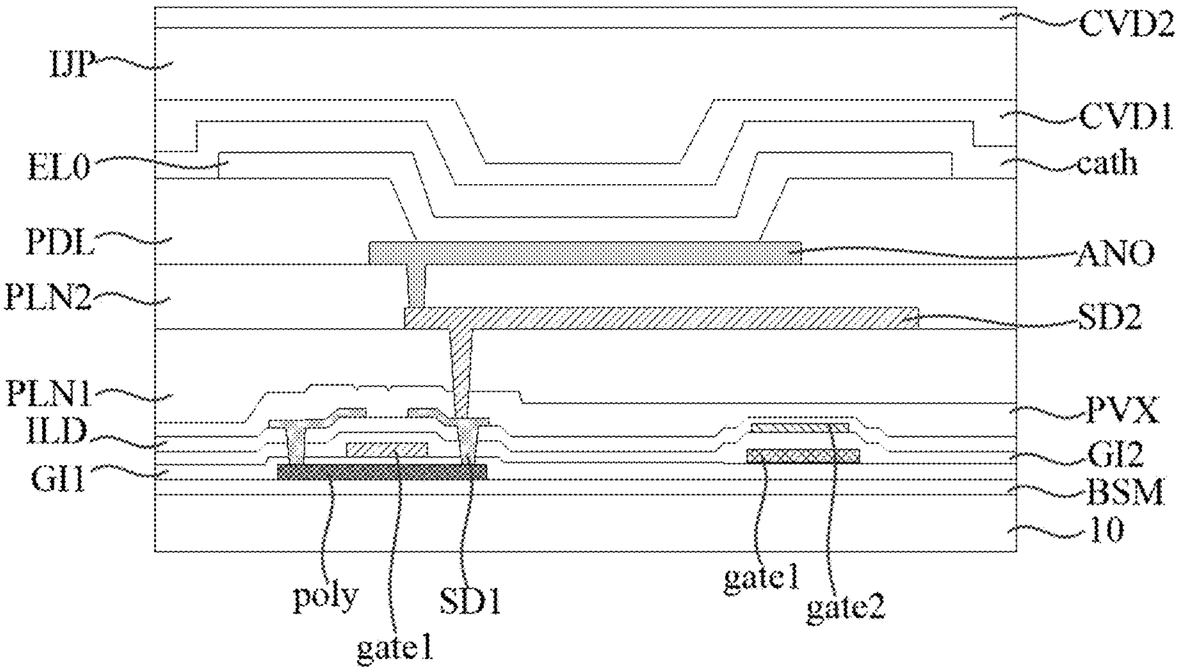
FIG. 2 is a sectional view of a display substrate according to one embodiment of the present disclosure.

As shown in FIG. 2, in some embodiments of the present disclosure, the display substrate includes a light-shielding layer BSM, an active layer poly, a first gate insulation layer GI1, a first gate metal layer gate1, a second gate insulation layer GI2, a second gate metal layer gate2, an interlayer insulation layer ILD, a first source/drain metal layer SD1, a first planarization layer PLN1, a second source/drain metal layer SD2, a second planarization layer PLN2, an anode layer ANO, a pixel definition layer PDL, a light-emitting functional layer EL0, a cathode layer cath, a first inorganic encapsulation layer CVD1, an organic encapsulation layer IJP and a second inorganic encapsulation layer CVD2 laminated one on another in a direction away from the base substrate 10. The display substrate may further include, but not limited to, a passivation layer PVX.

As shown in FIG. 1, in some embodiments of the present disclosure, the sub-pixel driving circuitry has, but not limited to, an 8T1C structure (including 8 transistors and 1 storage capacitor Cst).

The 8T1C structure includes a first transistor T1 (namely, the first resetting transistor), a second transistor T2 (namely, the compensation transistor), a third transistor T3 (namely, the driving transistor), a fourth transistor T4, a fifth transistor T5, a sixth transistor T6, a seventh transistor T7 (namely, the second resetting transistor), an eighth transistor T8 (namely, the third resetting transistor) and a storage capacitor Cst. The first transistor T1, the second transistor T2, the third transistor T3, the fourth transistor T4, the fifth transistor T5, the sixth transistor T6, the seventh transistor T7 and the eighth transistor T8 are each a P-type transistor.

A gate electrode of the first transistor T1 is coupled to a corresponding resetting signal line RST, a first electrode of the first transistor T1 is configured to receive the first initialization signal Vinit1, and a second electrode of the first transistor T1 is coupled to a gate electrode T3-g of the third transistor T3.

A gate electrode of the second transistor T2 is coupled to a corresponding first scanning line G1, a first electrode of the second transistor T2 is coupled to a second electrode of the third transistor T3, and a second electrode of the second transistor T2 is coupled to the gate electrode T3-g of the third transistor T3.

A gate electrode of the fourth transistor T4 is coupled to a corresponding first scanning line G1, a first electrode of the fourth transistor T4 is coupled to a corresponding data line DA, and a second electrode of the fourth transistor T4 is coupled to a first electrode of the third transistor T3.

A gate electrode of the fifth transistor T5 is coupled to a corresponding light emission control signal line EM, a first electrode of the fifth transistor T5 is coupled to a corresponding power source line VDD, and a second electrode of the fifth transistor T5 is coupled to the first electrode of the third transistor T3.

A gate electrode of the sixth transistor T6 is coupled to a corresponding light-emitting control signal line EM, a first electrode of the sixth transistor T6 is coupled to a second electrode of the third transistor T3, and a second electrode of the sixth transistor T6 is coupled to an anode of the light-emitting element EL.

A gate electrode of the seventh transistor T7 is coupled to a corresponding second scanning line G2, a second electrode of the seventh transistor T7 is coupled to the anode of the light-emitting element EL, and a first electrode of the seventh transistor T7 is configured to receive the second initialization signal Vinit2.

A gate electrode of the eighth transistor T8 is coupled to a corresponding second scanning line G2, a first electrode of the eighth transistor T8 is configured to receive the third initialization signal Vinit3, and a second electrode of the eighth transistor T8 is coupled to the first electrode of the third transistor T3.

A first plate Cst1 of the storage capacitor Cst is coupled to the gate electrode T3-g of the third transistor T3, so the gate electrode of the third transistor T3 is directly reused as the first plate Cst1 of the storage capacitor Cst. A second plate Cst2 of the storage capacitor Cst is coupled to the corresponding power source line VDD.

Figure 12:
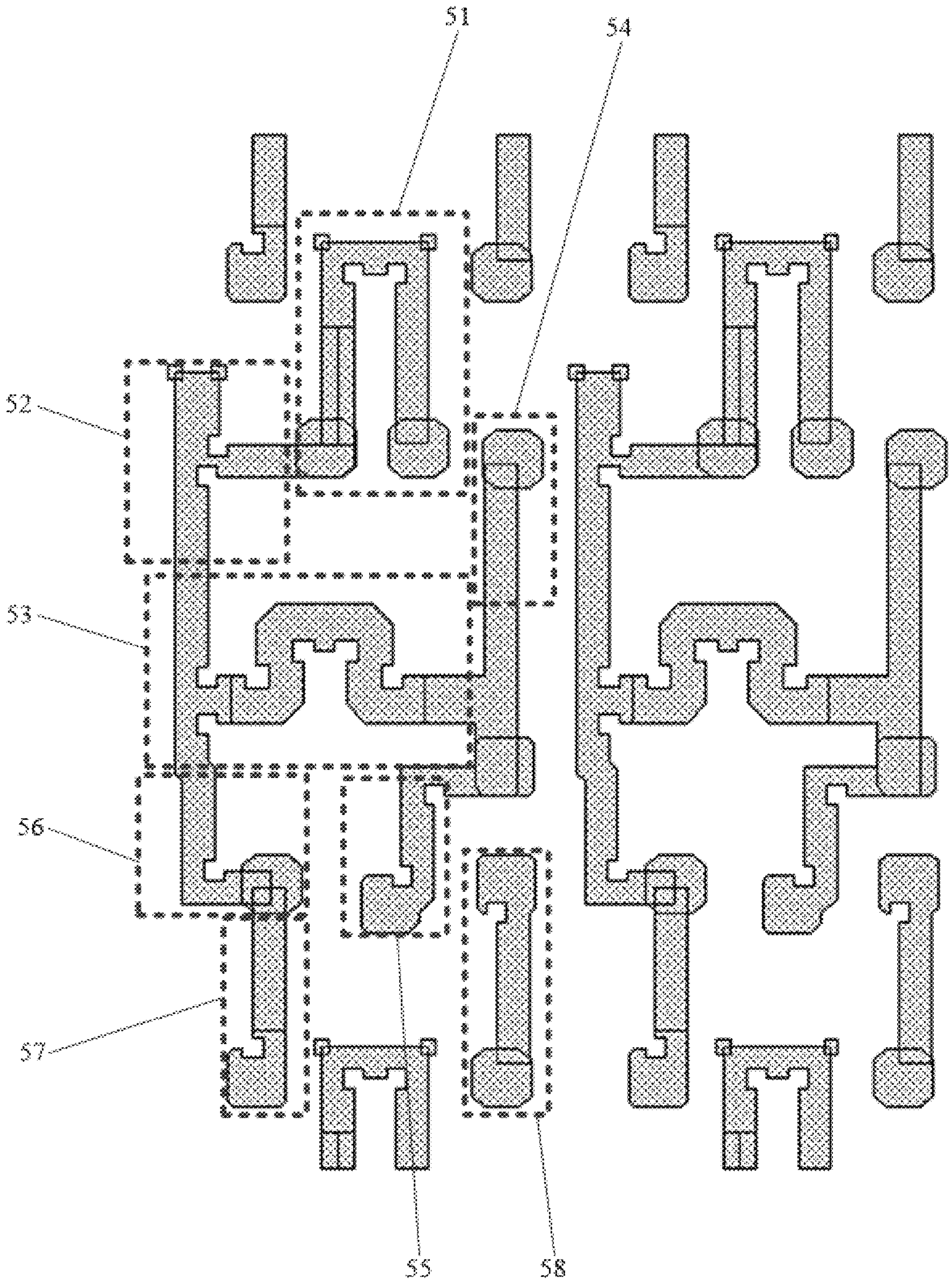
FIG. 12 is a schematic view showing the layout of the active layer in FIG. 7.
Figure 13:
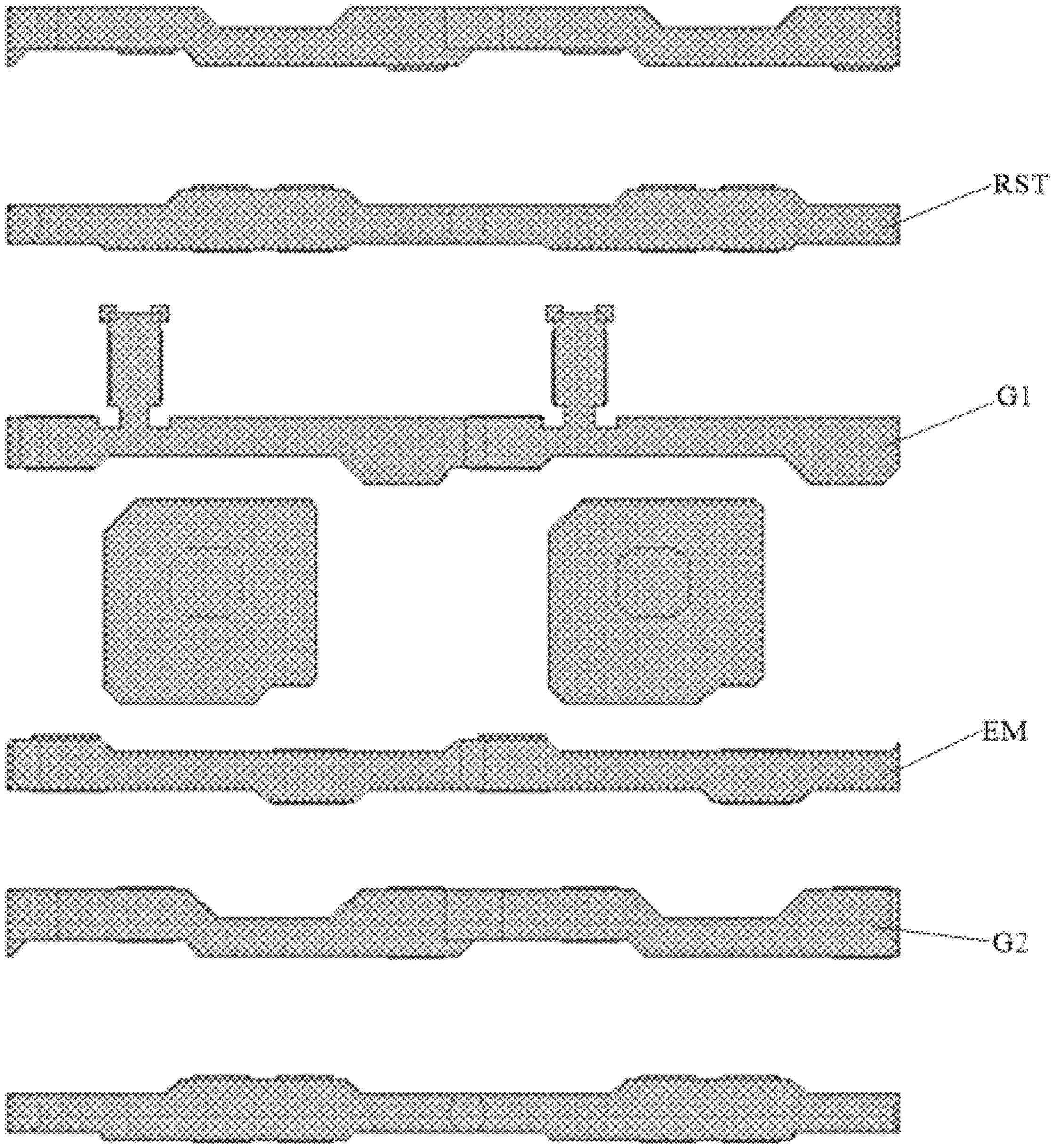
FIG. 13 is a schematic view showing the layout of the first gate metal layer in FIG. 7.
Figure 14:
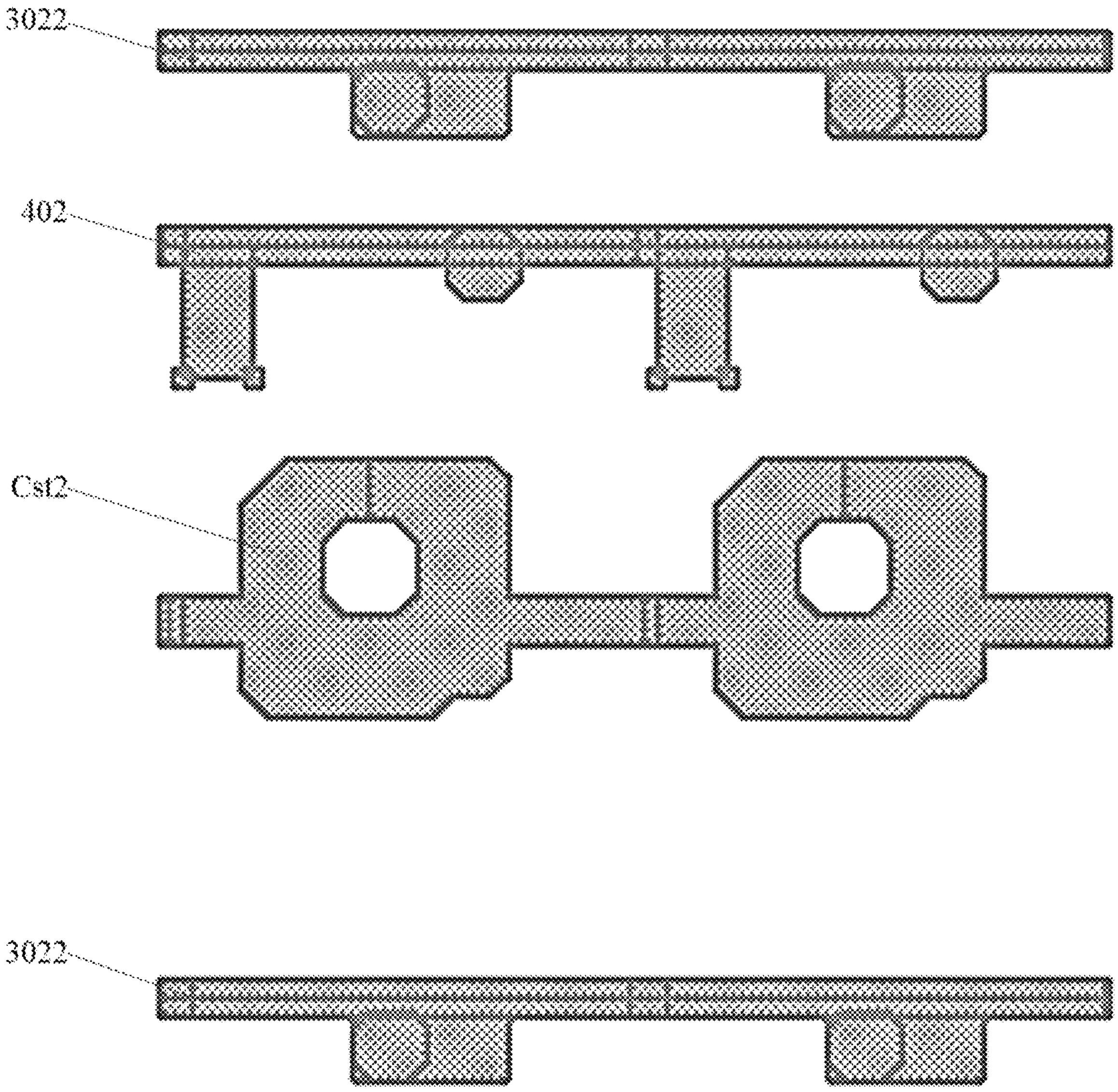
FIG. 14 is a schematic view showing the layout of the second gate metal layer in FIG. 7.
Figure 15:
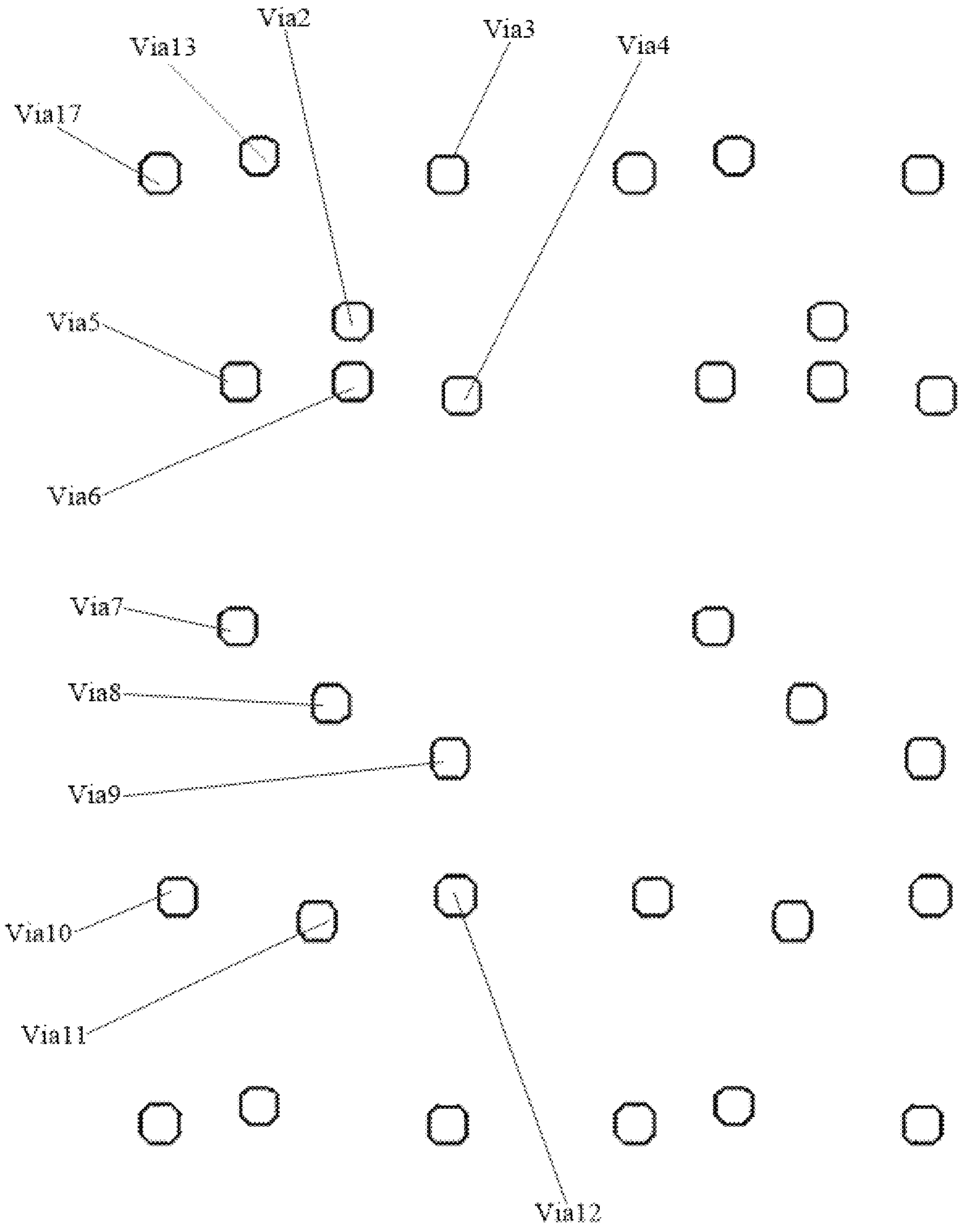
FIG. 15 is a schematic view showing the layout of a via-hole formed in an interlayer insulation layer in FIG. 7.

As shown in FIGS. 12 and 24, the first transistor T1 includes a first active layer 51, the third transistor T3 includes a third active layer 53, the fourth transistor T4 includes a fourth active layer 54, the fifth transistor T5 includes a fifth active layer 55, and the sixth transistor T6 includes a sixth active layer 56.

As shown in FIGS. 20 and 27-33, a first conductive connection member 61 is coupled to the third initialization branch 3022 through a third via-hole Via3. The first electrode of the seventh transistor T7 is coupled to the first extending sub-member 2022*a* or the second extending sub-member 2022*b* through a first via-hole Via1.

As shown in FIGS. 8, 15-18, 20, 27-33, a second conductive connection member 62 is coupled to the fourth initialization branch 402 through a second via-hole Via2. The second conductive connection member 62 is coupled to the first electrode of the first transistor T1 through a sixth via-hole Via6. A third conductive connection member 63 is coupled to the first electrode of the fourth transistor T4 through a fourth via-hole Via4. The third conductive connection member 63 is coupled to the data line DA through a fifteenth via-hole Via15. A fourth conductive connection member 64 is coupled to the second electrode of the first transistor T1 and the second electrode of the second transistor T2 through a fifth via-hole Via5. The fourth conductive connection member 64 is coupled to the gate electrode of the third transistor T3 through a seventh via-hole Via7. A fifth conductive connection member 65 is coupled to the second plate Cst2 of the storage capacitor Cst through an eighth via-hole Via8. The fifth conductive connection member 65 is coupled to the power source line VDD through a fourteenth via-hole Via14, and the fifth conductive connection member 65 is coupled to the first electrode of the fifth transistor T5 through an eleventh via-hole Via11. A sixth conductive connection member 66 is coupled to the second electrode of the sixth transistor T6 and the second electrode of the seventh transistor T7 through a tenth via-hole Via10. The sixth conductive connection member 66 is coupled to an eighth conductive connection member 68 through a sixteenth via-hole Via16. A seventh conductive connection member 67 is coupled to the first electrode of the third transistor T3 and the second electrode of the fifth transistor T5 through a ninth via-hole Via9. The seventh conductive connection member 67 is coupled to the second electrode of the eighth transistor T8 through a twelfth via-hole Via12.

As shown in FIGS. 8 and 15-18, a ninth conductive connection member 69 is coupled to the third initialization branch 3022 through a thirteenth via-hole Via13. The ninth conductive connection member 69 is coupled to the first electrode of the seventh transistor T7 through a seventeenth via-hole Via17.

The present disclosure further provides in some embodiments a display device which includes the above-mentioned display substrate.

The display device includes, but not limited to, an active matrix organic light-emitting diode display device.

It should be appreciated that, the display device may be any product or member having a display function, such as a television, a display, a digital photo frame, a mobile phone, or a tablet computer. The display device further includes a flexible circuit board, a printed circuit board and a back plate.

According to the structure of the display substrate in the embodiments of the present disclosure, the plurality of columns of sub-pixel driving circuitries is divided into the plurality of column units, and the sub-pixel driving circuitries in each column unit are coupled to the first initialization bus through a corresponding first initialization branch. In this way, it is able to not only ensure that each sub-pixel driving circuitry in the display substrate receives the initialization signal, but also reduce the quantity of first initialization branches, thereby to reduce the layout difficulty of the first initialization signal transmission layer in a limited layout space. Furthermore, the first initialization branch includes the first branch body member and the plurality of first branch extending members, and the first branch body member is coupled to the first initialization bus, and coupled to each sub-pixel driving circuitry in a corresponding column unit through the first branch extending member. As a result, it is able to shorten the first initialization branch, reduce the loading of the first initialization branch, and ensure a uniform voltage of the initialization signal received by the sub-pixel driving circuitries at different positions, thereby to ensure the stability of the initialization signal and prevent the occurrence of mura.

When the display device includes the above-mentioned display substrate, it also has the above-mentioned beneficial effects, which will not be particularly defined herein.

The present disclosure further provides in some embodiments a display substrate, which includes a base substrate and a plurality of sub-pixels arranged on the base substrate. The sub-pixel includes a sub-pixel driving circuitry. The plurality of sub-pixel driving circuitries in the plurality of sub-pixels is arranged in columns along a first direction. The sub-pixel driving circuitries in each column include a plurality of sub-pixel driving circuitries arranged along a second direction. The first direction intersects with the second direction. The columns of sub-pixel driving circuitries are divided into a plurality of column units, and each column unit includes at least two adjacent columns of sub-pixel driving circuitries. The display substrate further includes: a plurality of first initialization branches, an orthogonal projection of at least a part of the first initialization branch onto the base substrate being located between orthogonal projections of the sub-pixel driving circuitries in adjacent columns onto the base substrate, the first initialization branch including a first branch body member and a plurality of first branch extending members, the first branch body member including at least a portion extending along the second direction, the first branch extending member including at least a portion extending along the first direction, and the first branch body member being coupled to the sub-pixel driving circuitries in a corresponding column unit through the plurality of first branch extending members; and a plurality of second initialization branches and a plurality of third initialization branches, the plurality of second initialization branches being coupled to the plurality of third initialization branches to form a grid-like branch, the plurality of sub-pixel driving circuitries in the plurality of sub-pixels being arranged in rows along the second direction, the sub-pixel driving circuitries in each row including a plurality of sub-pixel driving circuitries arranged along the first direction, the third initialization branch being coupled to the sub-pixel driving circuitries in a corresponding row. Orthogonal projections of the first branch body members onto the base substrate and orthogonal projections of the second initialization branches onto the base substrate are arranged alternately.

According to the structure of the display substrate in the embodiments of the present disclosure, the plurality of columns of sub-pixel driving circuitries is divided into the plurality of column units, and the sub-pixel driving circuitries in each column unit are coupled to the first initialization bus through a corresponding first initialization branch. In this way, it is able to not only ensure that each sub-pixel driving circuitry in the display substrate receives the initialization signal, but also reduce the quantity of first initialization branches, thereby to reduce the layout difficulty of the first initialization signal transmission layer in a limited layout space. Furthermore, the first initialization branch includes the first branch body member and the plurality of first branch extending members, and the first branch body member is coupled to the first initialization bus, and coupled to each sub-pixel driving circuitry in a corresponding column unit through the first branch extending member. As a result, it is able to shorten the first initialization branch, reduce the loading of the first initialization branch, and ensure a uniform voltage of the initialization signal received by the sub-pixel driving circuitries at different positions, thereby to ensure the stability of the initialization signal and prevent the occurrence of mura.

In the embodiments of the present disclosure, the plurality of second initialization branches and the plurality of third initialization branches are coupled to form a grid-like branch, so as to reduce the loading of the second initialization branches and the third initialization branches.

In some embodiments of the present disclosure, the display substrate further includes a second scanning line, the sub-pixel driving circuitry includes a driving transistor and a third resetting transistor, a gate electrode of the third resetting transistor is coupled to a corresponding second scanning line, and a second electrode of the third resetting transistor is coupled to a first electrode of the driving transistor. The sub-pixel includes a light-emitting element, the sub-pixel driving circuitry further includes a second resetting transistor, a gate electrode of the second resetting transistor is coupled to a corresponding second scanning line, and a second electrode of the second resetting transistor is coupled to the light-emitting element. The first branch extending member is coupled to a first electrode of the third resetting transistor in a corresponding sub-pixel driving circuitry, and the third initialization branch is coupled to a first electrode of the second resetting transistor in each sub-pixel driving circuitry in a corresponding row; or the first branch extending member is coupled to a first electrode of the second resetting transistor in a corresponding sub-pixel driving circuitry, and the third initialization branch is coupled to a first electrode of the third resetting transistor in each sub-pixel driving circuitry in a corresponding row.

It should be appreciated that, the expression "at a same layer" refers to that the film layers are arranged on a same structural layer. Alternatively, for example, the film layers on a same layer may be layer structures formed through forming thin layers for forming specific patterns through a single-film-forming process and then patterning the film layers with a same mask through a single patterning process. Depending on different specific patterns, a single patterning process may include multiple exposing, development or etching processes, and the specific patterns in the layer structure may be continuous or discontinuous. These specific patterns may also be arranged at different levels or have different thicknesses.

In the embodiments of the present disclosure, the order of the steps is not limited to the serial numbers thereof. For a person skilled in the art, any change in the order of the steps shall also fall within the scope of the present disclosure if without any creative effort.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right"

are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a base substrate and a plurality of sub-pixels arranged on the base substrate, wherein the sub-pixel comprises a sub-pixel driving circuitry, the plurality of sub-pixel driving circuitries of the plurality of sub-pixels is arranged in columns along a first direction, the sub-pixel driving circuitries in each column comprise a plurality of sub-pixel driving circuitries arranged along a second direction, the first direction intersects with the second direction, the plurality of columns of sub-pixel driving circuitries is divided into a plurality of column units, and the column unit comprises at least two adjacent columns of sub-pixel driving circuitries, wherein the display substrate further comprises a first initialization signal transmission layer comprising a first initialization bus and a plurality of first initialization branches coupled to the first initialization bus, the first initialization branch comprises a first branch body member and a plurality of first branch extending members, the first branch body member comprises at least a portion extending along the second direction, the first branch extending member comprises at least a portion extending along the first direction, and the first branch body member is coupled to the sub-pixel driving circuitries in a corresponding column unit through the plurality of first branch extending members respectively;

wherein the sub-pixel driving circuitries in the column unit are divided into a plurality of row units arranged along the second direction, the row unit comprises at least two sub-pixel driving circuitries arranged along the first direction, and the first branch extending member is coupled to the sub-pixel driving circuitries in a corresponding row unit;

wherein the first branch extending member comprises a first extending sub-member and a second extending sub-member, the first extending sub-member is located at a first side of the first branch body member and coupled to the sub-pixel driving circuitries located at the first side of the first branch body member in the corresponding row unit, the second extending sub-member is located at a second side of the first branch body member and coupled to the sub-pixel driving circuitries located at the second side of the first branch body member in the corresponding row unit, and the first side is opposite to the second side along the first direction.

2. The display substrate according to claim 1, wherein the first branch extending members are located at a same side of the first branch body member along the first direction, and the first branch extending member is coupled to the sub-pixel driving circuitries located at the same side in the corresponding row unit.

3. The display substrate according to claim 1, further comprising a second scanning line, wherein the sub-pixel driving circuitry comprises a driving transistor and a third resetting transistor, a gate electrode of the third resetting transistor is coupled to the corresponding second scanning line, a second electrode of the third resetting transistor is coupled to a first electrode of the driving transistor, the first extending sub-member is coupled to a first electrode of the third resetting transistor in a corresponding sub-pixel driving circuitry, and the second extending sub-member is coupled to a first electrode of the third resetting transistor in a corresponding sub-pixel driving circuitry.

4. The display substrate according to claim 3, wherein the third resetting transistor comprises a third resetting active layer, an orthogonal projection of a first end of the first extending sub-member onto the base substrate is spaced apart from an orthogonal projection of the third resetting active layer coupled to the first extending sub-member and arranged closest to the first branch body member onto the base substrate by a first distance along the first direction, and the first end is an end of the first extending sub-member close to the first branch body member coupled to the first extending sub-member, wherein an orthogonal projection of a first end of the second extending sub-member onto the base substrate is spaced apart from an orthogonal projection of the third resetting active layer coupled to the second extending sub-member and arranged closest to the first branch body member onto the base substrate by a second distance along the first direction, the first end is an end of the second extending sub-member close to the first branch body member coupled to the second extending sub-member, and the first distance is less than the second distance.

5. The display substrate according to claim 3, wherein an orthogonal projection of the first extending sub-member onto the base substrate does not overlap with an orthogonal projection of the second scanning line onto the base substrate; and/or an orthogonal projection of the second extending sub-member onto the base substrate partially overlaps with the orthogonal projection of the second scanning line onto the base substrate.

6. The display substrate according to claim 3, further comprising a second initialization signal line, wherein the sub-pixel comprises a light-emitting element, the sub-pixel driving circuitry comprises a second resetting transistor, a gate electrode of the second resetting transistor is coupled to a corresponding second scanning line, a first electrode of the second resetting transistor is coupled to the second initialization signal line, and a second electrode of the second resetting transistor is coupled to the light-emitting element, wherein the orthogonal projection of the first extending sub-member onto the base substrate at least partially overlaps with an orthogonal projection of the second initialization signal line onto the base substrate; and/or the orthogonal projection of the second extending sub-member onto the base substrate at least partially overlaps with the orthogonal projection of the second initialization signal line onto the base substrate.

7. The display substrate according to claim 1, further comprising a second scanning line, wherein the sub-pixel comprises a light-emitting element, the sub-pixel driving circuitry comprises a second resetting transistor, a gate electrode of the second resetting transistor is coupled to a corresponding second scanning line, and a second electrode of the second resetting transistor is coupled to the light-emitting element, wherein the first extending sub-member is coupled to a first electrode of the second resetting transistor in a corresponding sub-pixel driving circuitry, and the second extending sub-member is coupled to a first electrode of the second resetting transistor in a corresponding sub-pixel driving circuitry, wherein the second resetting transistor comprises a second resetting active layer, an orthogonal projection of a first end of the first extending sub-member onto the base substrate is spaced apart from an orthogonal projection of the second resetting active layer coupled to the first extending sub-member and arranged closest to the first branch body member onto the base substrate by a third distance along the first direction, and the first end is an end of the first extending sub-member close to the first branch body member coupled to the first extending sub-member, wherein an orthogonal projection of a first end of the second extending sub-member onto the base substrate is spaced apart from an orthogonal projection of the second resetting active layer coupled to the second extending sub-member and arranged closest to the first branch body member onto the base substrate by a fourth distance along the first direction, the first end is an end of the second extending sub-member close to the first branch body member coupled to the second extending sub-member, and the third distance is greater than the fourth distance, and/or wherein an orthogonal projection of the first extending sub-member onto the base substrate partially overlaps with an orthogonal projection of the second scanning line onto the base substrate; and/or an orthogonal projection of the second extending sub-member onto the base substrate does not overlap with the orthogonal projection of the second scanning line onto the base substrate, and/or wherein the display substrate further comprises a third initialization signal line, wherein the sub-pixel driving circuitry comprises a driving transistor and a third resetting transistor, a gate electrode of the third resetting transistor is coupled to a corresponding second scanning line, a first electrode of the third resetting transistor is coupled to the third initialization signal line, and a second electrode of the third resetting transistor is coupled to the first electrode of the driving transistor, wherein an orthogonal projection of the first extending sub-member onto the base substrate at least partially overlaps with an orthogonal projection of the third initialization signal line onto the base substrate; and/or an orthogonal projection of the second extending sub-member onto the base substrate does not overlap with the orthogonal projection of the second initialization signal line onto the base substrate.

8. The display substrate according to claim 1, wherein the first branch body member and the first branch extending members form a one-piece structure, wherein the display substrate further comprises a first source/drain metal layer, wherein the first branch body member and the first branch extending members are arranged at a same layer and made of a same material as the first source/drain metal layer.

9. The display substrate according to claim 1, further comprising a second initialization signal transmission layer, wherein the second initialization signal transmission layer comprises two second initialization buses arranged opposite to each other along the second direction, and a grid-like branch located between the two second initialization buses and coupled to the two second initialization buses, wherein the grid-like branch comprises a plurality of second initialization branches arranged along the first direction and a plurality of third initialization branches arranged along the second direction, and the plurality of third initialization branches is coupled to the plurality of second initialization branches respectively, wherein the plurality of sub-pixel driving circuitries of the plurality of sub-pixels is arranged in rows along the second direction, and the sub-pixel driving circuitries in each row comprise a plurality of sub-pixel driving circuitries arranged along the first direction, wherein the third initialization branches are coupled to the sub-pixel driving circuitries in a corresponding row respectively.

10. The display substrate according to claim 9, further comprising a second scanning line, wherein the sub-pixel comprises a light-emitting element, the sub-pixel driving circuitry comprises a second resetting transistor, a gate electrode of the second resetting transistor is coupled to a corresponding second scanning line, and a second electrode of the second resetting transistor is coupled to the light-emitting element, wherein the third initialization branch is coupled to a first electrode of the second resetting transistor in each sub-pixel driving circuitry in the corresponding row.

11. The display substrate according to claim 9, further comprising a second scanning line, wherein the sub-pixel driving circuitry comprises a driving transistor and a third resetting transistor, a gate electrode of the third resetting transistor is coupled to a corresponding second scanning line, and a second electrode of the third resetting transistor is coupled to the first electrode of the driving transistor, wherein the third initialization branch is coupled to a first electrode of the third resetting transistor in each sub-pixel driving circuitry in the corresponding row.

12. The display substrate according to claim 9, further comprising a second gate metal layer and a first source/drain metal layer, wherein the second initialization branch is arranged at a same layer and made of a same material as the first source/drain metal layer, and the third initialization branch is arranged at a same layer and made of a same material as the second gate metal layer.

13. The display substrate according to claim 9, wherein orthogonal projections of a first branch body members onto the base substrate and orthogonal projections of b second initialization branches onto the base substrate are arranged alternately along the first direction, where a is an integer greater than or equal to 1, and b is an integer greater than or equal to 1.

14. The display substrate according to claim 9, further comprising a third initialization signal transmission layer comprising a third initialization bus and a plurality of fourth initialization branches coupled to the third initialization bus, wherein the sub-pixel driving circuitry comprises a driving transistor and a first resetting transistor, a first electrode of the first resetting transistor is coupled to a corresponding fourth initialization branch, and a second electrode of the first resetting transistor is coupled to the gate electrode of the driving transistor, wherein the fourth initialization branch comprises a fourth branch body member and a fourth branch protruding member, the fourth branch body member extends along the first direction, and the fourth branch protruding member protrudes from the fourth branch body member along the second direction, wherein the sub-pixel driving circuitry comprises a driving transistor and a compensation transistor, a first electrode of the compensation transistor is coupled to a second electrode of the driving transistor, a second electrode of the compensation transistor is coupled to a gate electrode of the driving transistor, the compensation transistor comprises a compensation active layer, the compensation active layer comprises two channel portions and a conductor portion coupled to the two channel portions, and an orthogonal projection of the conductor portion onto the base substrate at least partially overlaps with an orthogonal projection of the fourth branch protruding member onto the base substrate.

15. The display substrate according to claim 9, wherein the third initialization signal transmission layer comprises two third initialization buses arranged opposite to each other along the second direction, the plurality of fourth initialization branches is arranged along the first direction and coupled to the two third initialization buses respectively, and the fourth initialization branches are coupled to the sub-pixel driving circuitries in a corresponding column respectively, wherein orthogonal projections of a first branch body members onto the base substrate, orthogonal projections of b second initialization branches onto the base substrate, and orthogonal projections of c fourth initialization branches onto the base substrate are arranged alternately along the first direction, where a is an integer greater than or equal to 1, b is an integer greater than or equal to 1, and c is an integer greater than or equal to 1.

16. A display device, comprising the display substrate according to claim 1.

17. A display substrate, comprising a base substrate and a plurality of sub-pixels arranged on the base substrate, wherein the sub-pixel comprises a sub-pixel driving circuitry, the plurality of sub-pixel driving circuitries of the plurality of sub-pixels are arranged in columns along a first direction, the sub-pixel driving circuitries in each column comprise a plurality of sub-pixel driving circuitries arranged along a second direction, the first direction intersects with the second direction, the plurality of columns of sub-pixel driving circuitries is divided into a plurality of column units, and the column unit comprises at least two adjacent columns of sub-pixel driving circuitries, wherein the display substrate further comprises:

a plurality of first initialization branches, an orthogonal projection of at least a part of the first initialization branch onto the base substrate being located between orthogonal projections of the sub-pixel driving circuitries in adjacent columns onto the base substrate, the first initialization branch comprising a first branch body member and a plurality of first branch extending members, the first branch body member comprising at least a portion extending along the second direction, the first branch extending member comprising at least a portion extending along the first direction, and the first branch body member being coupled to the sub-pixel driving circuitries in a corresponding column unit through the plurality of first branch extending members; and a plurality of second initialization branches and a plurality of third initialization branches, the plurality of second initialization branches being coupled to the plurality of third initialization branches to form a grid-like branch, the plurality of sub-pixel driving circuitries in the plurality of sub-pixels being arranged in rows along the second direction, the sub-pixel driving circuitries in each row comprising a plurality of sub-pixel driving circuitries arranged along the first direction, the third initialization branch being coupled to the sub-pixel driving circuitries in a corresponding row, wherein orthogonal projections of the first branch body members onto the base substrate and orthogonal projections of the second initialization branches onto the base substrate are arranged alternately.

18. The display substrate according to claim 17, further comprising a second scanning line, wherein the sub-pixel driving circuitry comprises a driving transistor and a third resetting transistor, a gate electrode of the third resetting transistor is coupled to a corresponding second scanning line, and a second electrode of the third resetting transistor is coupled to a first electrode of the driving transistor, wherein the sub-pixel comprises a light-emitting element, the sub-pixel driving circuitry further comprises a second resetting transistor, a gate electrode of the second resetting transistor is coupled to a corresponding second scanning line, and a second electrode of the second resetting transistor is coupled to the light-emitting element, wherein the first branch extending member is coupled to a first electrode of the third resetting transistor in a corresponding sub-pixel driving circuitry, and the third initialization branch is coupled to a first electrode of the second resetting transistor in each sub-pixel driving circuitry in a corresponding row; or the first branch extending member is coupled to a first electrode of the second resetting transistor in a corresponding sub-pixel driving circuitry, and the third initialization branch is coupled to a first electrode of the third resetting transistor in each sub-pixel driving circuitry in a corresponding row.

* * * * *